United States Patent
Kim

(10) Patent No.: US 11,698,738 B2
(45) Date of Patent: Jul. 11, 2023

(54) MULTI-NAMESPACE STORAGE DEVICE, ELECTRONIC SYSTEM INCLUDING THE STORAGE DEVICE, AND METHOD OF OPERATING THE STORAGE DEVICE

(71) Applicant: SAMSUNG ELECTRONICS CO., LTD., Suwon-si (KR)

(72) Inventor: Hyun-Jin Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 35 days.

(21) Appl. No.: 17/382,694

(22) Filed: Jul. 22, 2021

(65) Prior Publication Data

US 2022/0129158 A1    Apr. 28, 2022

(30) Foreign Application Priority Data

Oct. 23, 2020    (KR) .................. 10-2020-0137977

(51) Int. Cl.
*G06F 3/06* (2006.01)
*G06F 12/0882* (2016.01)

(52) U.S. Cl.
CPC ............ *G06F 3/064* (2013.01); *G06F 3/0604* (2013.01); *G06F 3/0652* (2013.01); *G06F 3/0659* (2013.01); *G06F 3/0679* (2013.01); *G06F 12/0882* (2013.01); *G06F 2212/7201* (2013.01)

(58) Field of Classification Search
CPC ...... G06F 3/064; G06F 3/0604; G06F 3/0652; G06F 3/0659; G06F 3/0679; G06F 12/0882; G06F 2212/7201; G06F 3/0688; G06F 3/061

See application file for complete search history.

(56) References Cited

U.S. PATENT DOCUMENTS

| | | | |
|---|---|---|---|
| 6,408,298 B1* | 6/2002 | Van | G06F 16/10 |
| 8,635,326 B1* | 1/2014 | Chaganti | H04W 74/002 |
| | | | 455/414.1 |
| 8,914,429 B2* | 12/2014 | Pitts | G06F 16/10 |
| | | | 707/831 |
| 9,524,300 B2* | 12/2016 | Rajpal | G06F 3/0665 |
| 10,324,834 B2 | 6/2019 | Seo et al. | |

(Continued)

FOREIGN PATENT DOCUMENTS

| KR | 100205006 | 6/1999 |
|---|---|---|
| KR | 101979732 | 8/2019 |

*Primary Examiner* — Francisco A Grullon
(74) *Attorney, Agent, or Firm* — F. Chau & Associates, LLC

(57) ABSTRACT

A multi-namespace storage device includes a nonvolatile memory which includes a first memory block and a second memory block different from the first memory block, and a memory controller which receives, from a host, a command for requesting creation of a first namespace including a first logical block number and a second namespace including a second logical page number not included in the first logical block number and receives a physical mapping command for instructing physical mapping of the first namespace. The memory controller performs a first mapping operation by mapping the first logical block number to the first memory block and performs a second mapping operation by mapping the second logical page number to a second memory page included in the second memory block in response to the physical mapping command.

17 Claims, 20 Drawing Sheets

(56) References Cited

U.S. PATENT DOCUMENTS

| | | |
|---|---|---|
| 10,372,331 B2 | 8/2019 | Kanno |
| 10,402,092 B2 | 9/2019 | Dewitt et al. |
| 2010/0191779 A1* | 7/2010 | Hinrichs .............. G06F 3/0605 |
| | | 711/170 |
| 2014/0281040 A1* | 9/2014 | Liu ........................ G06F 9/50 |
| | | 710/3 |
| 2016/0342463 A1* | 11/2016 | Oshima .............. G06F 11/1004 |
| 2017/0351431 A1* | 12/2017 | Dewitt ................. G06F 3/0619 |
| 2018/0121344 A1* | 5/2018 | Seo ..................... G06F 12/0246 |
| 2018/0260334 A1* | 9/2018 | Asano ................. G06F 3/0644 |
| 2019/0227718 A1 | 7/2019 | Frolikov |
| 2019/0236021 A1 | 8/2019 | Lai et al. |
| 2019/0391928 A1 | 12/2019 | Lin |

* cited by examiner

FIG. 12

| LA | PA |
|---|---|
| LBN0 | BLK0 |
| ... | ... |
| LBN3 | BLK1 |
| ... | ... |
| LPNe | PPNd |
| ... | ... |
| LPNf | PPNf |
| ... | ... |
| LPNg | PPNc |
| ... | ... |
| LPNh | PPNh |
| LPNi | PPNb |
| ... | ... |
| LPNj | PPNa |
| ... | ... |
| LPNk | PPNg |
| ... | ... |
| LPNl | PPNe |

MT

NS1: LBN0 ... LBN3 ...
NS2: LPNe ... LPNh
NS3: LPNi ... LPNl

MULTI-NAMESPACE STORAGE DEVICE, ELECTRONIC SYSTEM INCLUDING THE STORAGE DEVICE, AND METHOD OF OPERATING THE STORAGE DEVICE

CROSS-REFERENCE TO RELATED APPLICATIONS

This application claims priority under 35 U.S.C. § 119 to Korean Patent Application No. 10-2020-0137977, filed on Oct. 23, 2020 in the Korean Intellectual Property Office, the disclosure of which is incorporated by reference herein in its entirety.

TECHNICAL FIELD

Embodiments of the present disclosure relate to a multi-namespace storage device, an electronic system including the storage device, and a method of operating the storage device.

DISCUSSION OF RELATED ART

Currently, research on the implementation of nonvolatile memory express (NVMe) storage devices is being conducted toward service level agreement (SLA) or weighted round robin (WRR) in a multi-tenant environment. To this end, research is also being conducted to improve structures such as physical function, virtual function, and multi-namespace.

As for the multi-namespace, a single NVMe storage device may be partitioned into areas defined as namespaces or logical addresses, and each area may be used for a different purpose.

For example, the areas may be divided by purpose, such as an area that mainly uses metadata write or random write for journaling and an area that mainly uses sequential write such as sequentialized pattern or backup. However, the above area division is applied only to logical addresses, and physical addresses are actually shared regardless of their purposes, which may result in performance degradation.

SUMMARY

Aspects of the present disclosure provide a multi-namespace storage device which has a different mapping attribute according to namespace classification of a host.

Aspects of the present disclosure also provide a multi-namespace electronic system which has a different mapping attribute according to namespace classification of a host.

Aspects of the present disclosure also provide a method of operating a multi-namespace storage device which has a different mapping attribute according to namespace classification of a host.

Aspects of the present disclosure also provide a multi-namespace storage device which maps a dedicated physical address to a namespace utilizing sequential write.

According to an aspect of the present disclosure, a multi-namespace storage device includes a nonvolatile memory which includes a first memory block and a second memory block different from the first memory block, and a memory controller which receives, from a host, a command for requesting creation of a first namespace including a first logical block number and a second namespace including a second logical page number not included in the first logical block number and receives a physical mapping command for instructing physical mapping of the first namespace. The memory controller performs a first mapping operation by mapping the first logical block number to the first memory block and performs a second mapping operation by mapping the second logical page number to a second memory page included in the second memory block in response to the physical mapping command.

According to an aspect of the present disclosure, a multi-namespace electronic system includes a plurality of nonvolatile memories which include a first nonvolatile memory and a second nonvolatile memory, a memory controller which controls the nonvolatile memories, and a host which is connected to the memory controller and sends a command for requesting creation of a first namespace including a first logical block number and a second namespace including a second logical page number not included in the first logical block number. The host sends a physical mapping command for instructing physical mapping of the first namespace, and the memory controller performs a first mapping operation by mapping the first logical block number to a first memory block in the first nonvolatile memory and performs a second mapping operation by mapping the second logical page number to a second memory page included in the second nonvolatile memory in response to the physical mapping command.

According to an aspect of the present disclosure, a method of operating a multi-namespace storage device includes sending a command for requesting creation of a first namespace including a first logical block number to a memory controller, sending a first write command for the first logical block number to the memory controller together with a physical mapping command for instructing physical mapping of the first namespace, storing first mapping information of the first logical block number to a first memory block corresponding to the first logical block number in a mapping table in response to the physical mapping command, performing a first write operation on the first memory block in response to the physical mapping command, sending a second write command for the first logical block number to the memory controller after the sending of the first write command, and performing a second write operation on the first memory block based on the second write command and the mapping table.

BRIEF DESCRIPTION OF THE DRAWINGS

The above and other features of the present disclosure will become more apparent by describing in detail embodiments thereof with reference to the accompanying drawings, in which:

FIG. 12 illustrates a mapping table corresponding to the mapping of FIG. 11;

DETAILED DESCRIPTION

Figure 1:
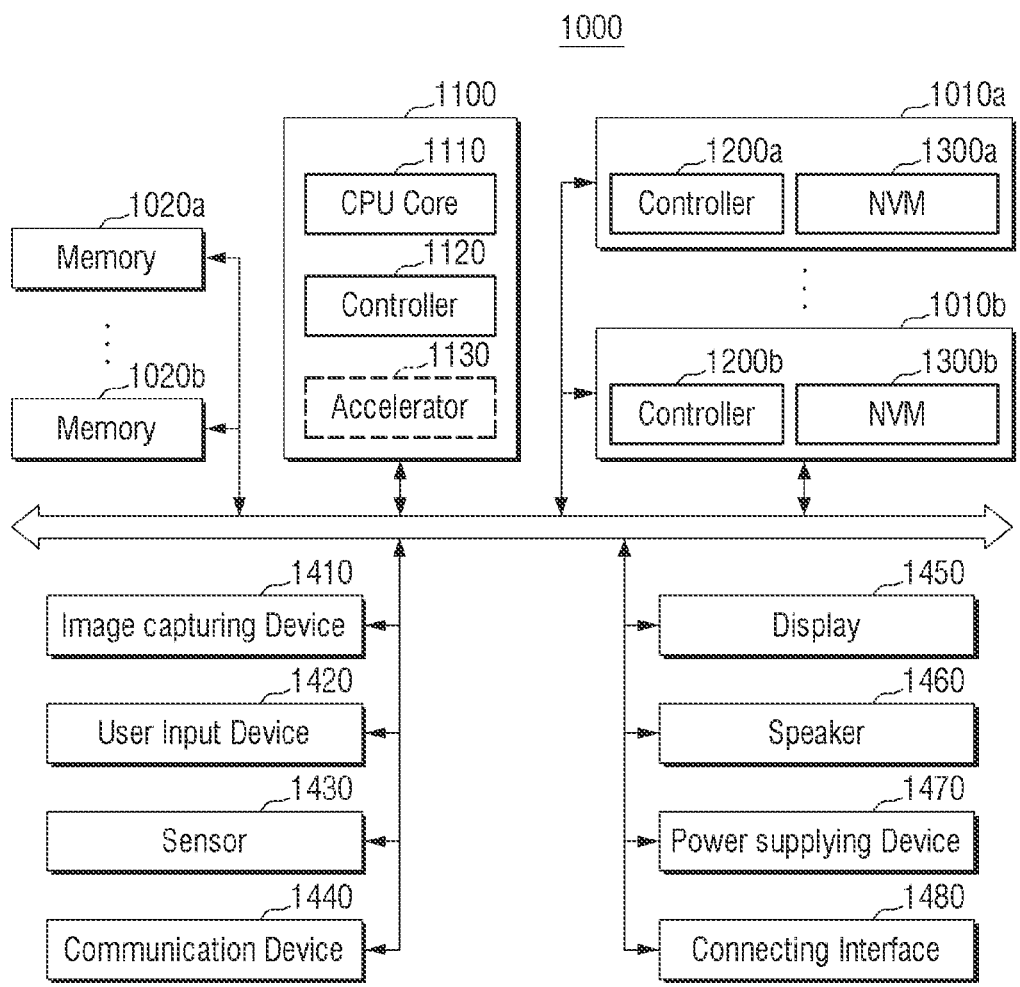
FIG. 1 is a block diagram of an electronic system according to embodiments of the present disclosure.

Embodiments of the present disclosure will be described more fully hereinafter with reference to the accompanying drawings. Like reference numerals may refer to like elements throughout the accompanying drawings. For convenience of explanation, a repetitive description of components and technical aspects described previously in the Specification may be subsequently omitted.

It will be understood that the terms "first," "second," "third," etc. are used herein to distinguish one element from another, and the elements are not limited by these terms. Thus, a "first" element in an embodiment may be described as a "second" element in another embodiment.

As used herein, the singular forms "a", "an" and "the" are intended to include the plural forms as well, unless the context clearly indicates otherwise.

A system 1000 of FIG. 1 may be a mobile system such as, for example, a portable communication terminal (mobile phone), a smartphone, a tablet personal computer, a wearable device, a healthcare device, or an Internet of things (IOT) device. However, the system 1000 of FIG. 1 is not necessarily limited to such a mobile system and may also be, for example, a personal computer, a laptop computer, a server, a media player, or an automotive device such as a navigation device.

Referring to FIG. 1, the system 1000 may include a main processor 1100, memories 1020a and 1020b, and storage devices 1010a and 1010b, and may additionally include one or more of an image capturing device 1410, a user input device 1420, a sensor 1430, a communication device 1440, a display 1450, a speaker 1460, a power supplying device 1470 and a connecting interface 1480.

The main processor 1100 may control the overall operation of the system 1000. For example, the main processor 1100 may control the operations of other components constituting the system 1000. The main processor 1100 may be implemented as, for example, a general-purpose processor, a dedicated processor, or an application processor.

The main processor 1100 may include one or more central processing unit (CPU) cores 1110 and may further include a controller 1120 for controlling the memories 1020a and 1020b and/or the storage devices 1010a and 1010b. According to an embodiment, the main processor 1100 may further include an accelerator block 1130 which is a dedicated circuit for high-speed data operation such as artificial intelligence (AI) data operation. The accelerator block 1130 may include, for example, a graphics processing unit (GPU), a neural processing unit (NPU) and/or a data processing unit (DPU), and may be implemented as a separate chip physically independent of other components of the main processor 1100.

The memories 1020a and 1020b may be used as main memory devices of the system 1000 and may include volatile memories such as, for example, static random access memories (SRAMs) and/or dynamic random access memories (DRAMs), and may also include nonvolatile memories such as, for example, flash memories, phase-change random access memories (PRAMs) and/or resistive random access memories (RRAMs). The memories 1020a and 1020b may also be implemented in the same package as the main processor 1100. Although FIG. 1 illustrates two memories 1020a and 1020b and two storage devices 1010a and 1010b, embodiments are not limited thereto. For example, in some embodiments, the memories 1020a and 1020b may include one memory or three or more memories, and the storage devices 1010a and 1010b may include one storage device or three or more storage devices.

The storage devices 1010a and 1010b may function as nonvolatile storage devices that store data regardless of whether power is supplied and may have a relatively larger storage capacity than the memories 1020a and 1020b. The storage devices 1010a and 1010b may respectively include storage controllers 1200a and 1200b and nonvolatile memories 1300a and 1300b which store data under the control of the storage controllers 1200a and 1200b. The nonvolatile memories 1300a and 1300b may include V-NAND flash memories having a two-dimensional (2D) or three-dimensional (3D) structure, and may also include other types of nonvolatile memories such as PRAMs and/or RRAMs.

The storage devices 1010a and 1010b included in the system 1000 may be physically separated from the main processor 1100 or may be implemented in the same package as the main processor 1100. In addition, the storage devices 1010a and 1010b may be in the form of memory cards, and thus, may be detachably coupled to other components of the system 1000 through an interface such as the connecting interface 1480 which will be described later. The storage devices 1010a and 1010b may be, but are not necessarily limited to, devices to which a standard protocol such as universal flash storage (UFS) is applied.

The image capturing device 1410 may capture still images or moving images and may be, for example, a camera, a camcorder, and/or a webcam.

The user input device 1420 may receive various types of data from a user of the system 1000 and may be, for example, a touch pad, a keypad, a keyboard, a mouse and/or a microphone.

The sensor 1430 may detect various types of physical input that can be obtained from outside the system 1000 and may convert the detected physical input into electrical signals. The sensor 1430 may be, for example, a temperature sensor, a pressure sensor, an illuminance sensor, a position sensor, an acceleration sensor, a biosensor and/or a gyroscope.

The communication device 1440 may transmit and receive signals to and from other devices outside the system 1000 according to various communication protocols. The communication device 1440 may include, for example, an antenna, a transceiver, and/or a modem.

The display 1450 and the speaker 1460 may function as output devices that output visual information and audio information to the user of the system 1000, respectively.

The power supplying device 1470 may convert power supplied from a battery built in the system 1000 and/or an external power source and supply the power to each component of the system 1000.

The connecting interface 1480 may provide a connection between the system 1000 and an external device which is connected to the system 1000 to exchange data with the system 1000. The connecting interface 1480 may be implemented as various interfaces such as, for example, advanced technology attachment (ATA), serial-ATA (SATA), external SATA (e-SATA), small computer small interface (SCSI), serial attached SCSI (SAS), peripheral component interconnection (PCI), PCI express (PCIe), NVM express (NVMe), IEEE 1394, universal serial bus (USB), secure digital (SD) card, multi-media card (MMC), embedded multi-media card (eMMC), universal flash storage (UFS), embedded universal flash storage (eUFS), and compact flash (CF) card interfaces.

Figure 2:
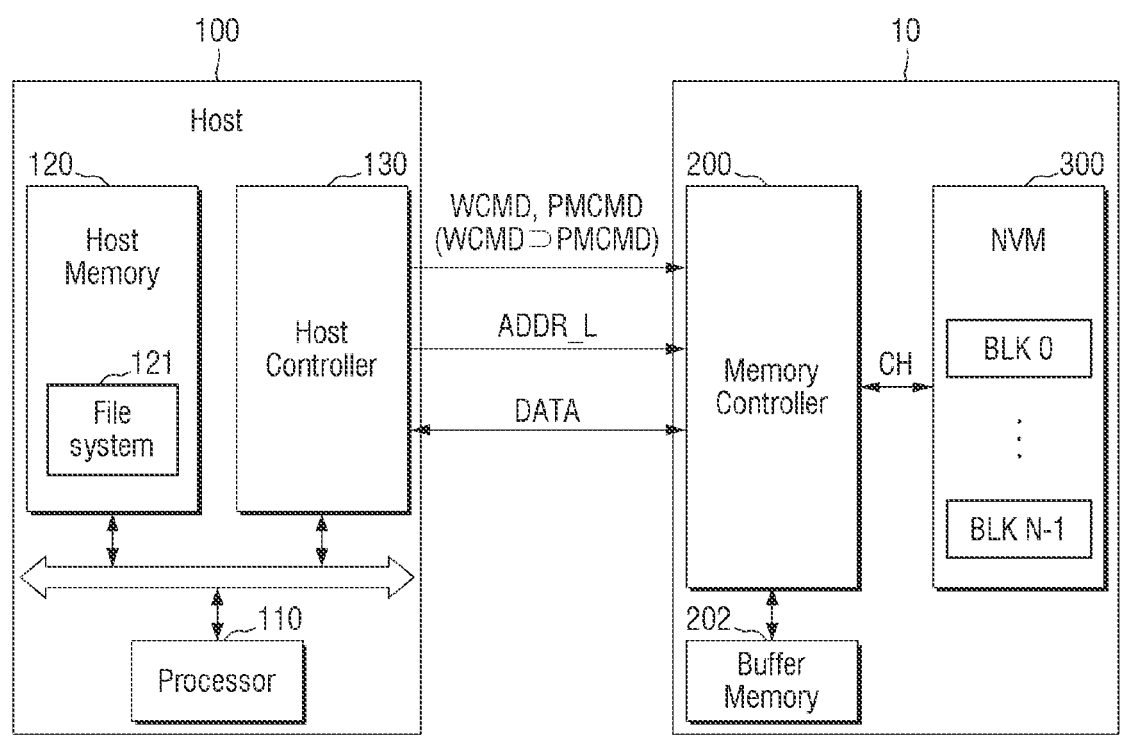
FIG. 2 is a block diagram of an electronic system including a storage device according to embodiments of the present disclosure.

FIG. 2 is a block diagram of an electronic system 1 including a storage device 10 according to embodiments of the present disclosure.

Referring to FIG. 2, the electronic system 1 may include the storage device 10 and a host device 100. The host device 100 may control the operation of the storage device 10. The storage device 10 may correspond to the storage devices 1010*a* and 1010*b* of FIG. 1.

In some embodiments, the storage device 10 may be a flash memory device including one or more flash memory chips. In an embodiment, the storage device 10 may be an embedded memory of the electronic system 1. For example, the storage device 10 may be an eMMC or an embedded UFS memory device.

According to an embodiment, the storage device 10 may be an external memory detachable from the electronic system 1. For example, the storage device 10 may be a UFS memory card, compact flash (CF), secure digital (SD), micro secure digital (micro-SD), mini secure digital (mini-SD), extreme digital (xD), or a memory stick.

The host device 100 may include a processor 110, a host memory 120, and a host controller 130. The processor 110, the host memory 120, and the host controller 130 may transmit and receive signals to and from each other through an internal bus.

The processor (CPU core) 110 may execute various software loaded into the host memory 120. For example, the processor 110 may execute an operating system and application programs. The processor 110 may be provided as a homogeneous multi-core processor or a heterogeneous multi-core processor.

The host memory 120 may be used as a main memory or a cache memory. In addition, the host memory 120 may be used as a driving memory for driving software or firmware. Application programs or data to be processed by the processor 110 may be loaded into the host memory 120. For example, a file system 121, an application program, and a device driver may be loaded into the host memory 120.

The file system 121 organizes files or data when the files or the data are stored in the storage device 10. The file system 121 may provide a logical address ADDR_L according to a command (e.g., a write command WCMD or a read command) to the storage device 10. The file system 121 may be used according to a specific operating system running on the host device 100.

The host device 100 may manage a storage space of the storage device 10 by using the file system 121, write user data to the storage device 10, and read the user data from the storage device 10. The file system 121 may be implemented through software or firmware.

The host controller 130 may convert the format of data such as a command (e.g., WCMD or PMCMD), the logical address ADDR_L and data DATA corresponding to various access requests issued by the host device 100 or convert the format of an exchanged command and transmit the data or the exchanged command to the storage device 10. A protocol of the host controller 130 may correspond to the connecting interface 1480 of FIG. 1.

In some embodiments, the host device 100 may provide a physical mapping command PMCMD distinguished from the write command WCMD to the storage device 10, separately from the write command WCMD. In an embodiment, the physical mapping command PMCMD may be included in a part of the write command WCMD.

The storage device 10 may include a memory controller 200, a buffer memory 202, and a nonvolatile memory 300. The storage device 10 may access the nonvolatile memory 300 or perform requested operations in response to a command received from the host device 100.

The memory controller 200 may control the operation of the nonvolatile memory 300 through a channel CH. The memory controller 200 may receive the write command WCMD and the logical address ADDR_L from the host device 100 and write the data DATA to the nonvolatile memory 300.

The memory controller 200 may determine a mapping attribute for the logical address ADDR_L received from the host device 100 in response to the physical mapping command PMCMD.

The configuration and operation of the memory controller 200 will be described in detail later with reference to FIG. 3.

The buffer memory 202 may temporarily store write data or read data. The write data temporarily stored in the buffer memory 202 may be written to the nonvolatile memory 300, and the read data temporarily stored in the buffer memory 202 may be transmitted to the host device 100 through the memory controller 200.

The nonvolatile memory 300 may perform a read/write operation under the control of the memory controller 200. The nonvolatile memory 300 may include a plurality of memory blocks BLK 0 through BLK N−1, and each of the memory blocks BLK 0 through BLK N−1 may include a plurality of pages. Each of the pages may include a plurality of memory cells. In an embodiment, the nonvolatile memory 300 may perform an erase operation on a memory block-by-memory block basis and perform a write or read operation on a page-by-page basis.

A physical address may correspond to a specific area of the nonvolatile memory 300. For example, a physical address for selecting a page may be a physical page number PPN, and a physical address for selecting a memory block may be a physical block number PBN.

In some embodiments, the nonvolatile memory 300 may include a plurality of flash memory cells. For example, the memory cells may be NAND flash memory cells. However, the present disclosure is not limited thereto, and the memory cells may also be, for example, resistive memory cells such as RRAMs, PRAMs, or magnetic RAMs (MRAMs).

Figure 3:
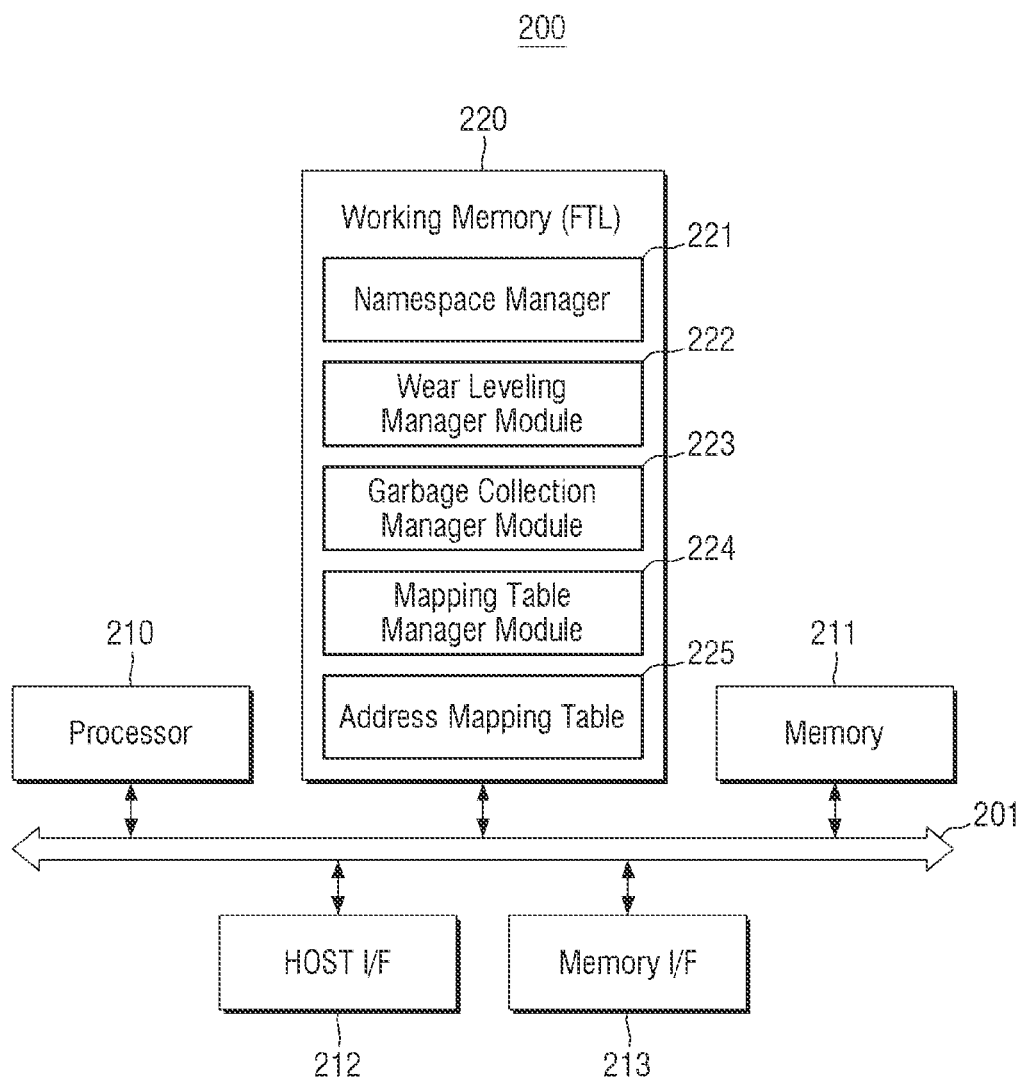
FIG. 3 is a block diagram of a memory controller of FIG. 2.
Figure 4:
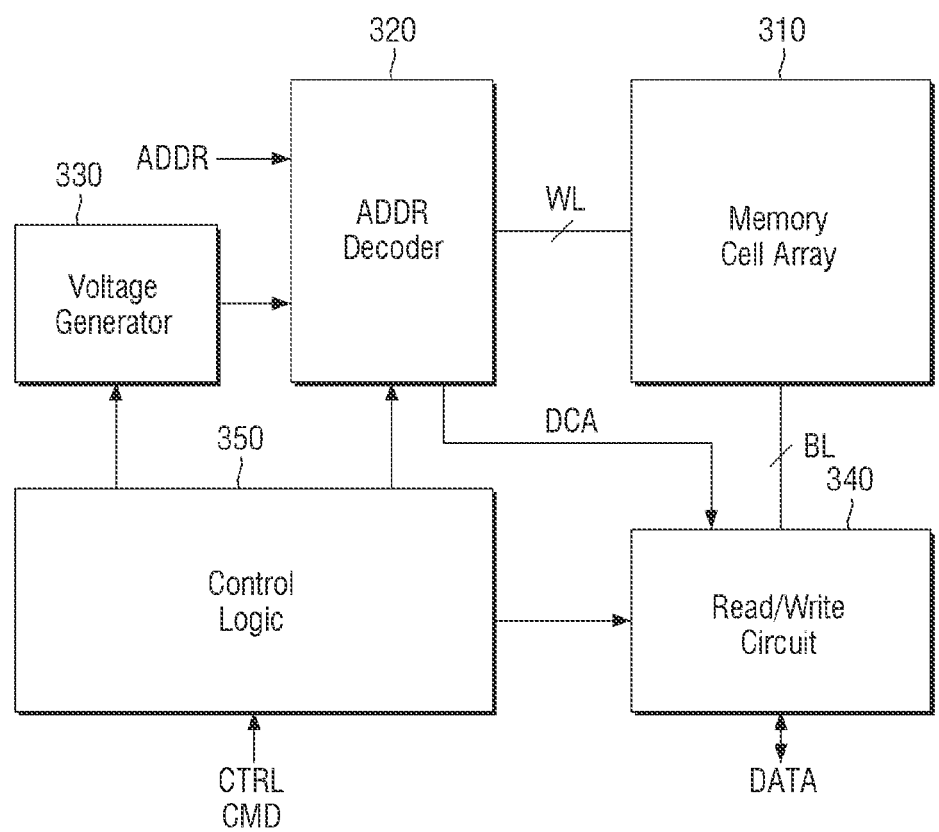
FIG. 4 is a block diagram of a nonvolatile memory of FIG. 2.

FIG. 3 is a block diagram of the memory controller 200 of FIG. 2. FIG. 4 is a block diagram of the nonvolatile memory 300 of FIG. 2.

Referring to FIGS. 3 and 4, the memory controller 200 may include a processor 210, a memory 211, a host interface 212, a memory interface 213, and a working memory 220.

The processor 210 may include, for example, a CPU, a controller, or an application specific integrated circuit (ASIC). The processor 210 may control the overall operation of the memory controller 200. The processor 210 may control the memory controller 200 by driving firmware loaded into the working memory 220.

The memory 211 may store code data utilized for initial booting of the storage device 10 (see FIG. 2).

The memory controller 200 and the host device 100 may be connected through the host interface 212. That is, the data DATA may be transmitted and received through the host interface 212. The host interface 212 may include, for example, ATA, SATA, e-SATA, USB, or NVMe.

The memory controller 200 and the nonvolatile memory 300 may be connected through the memory interface 213. That is, the data DATA, a control signal CTRL, an address ADDR, a command CMD, and the like may be transmitted and received through the memory interface 213. The working memory 220 may be implemented as, for example, a cache memory, a DRAM, an SRAM, or a flash memory.

The working memory 220 may include a flash transition layer (FTL). The FTL may include system software that manages write, read and erase operations of the nonvolatile memory 300. For example, the FTL may include firmware. The FTL may be loaded into the working memory 220. The firmware of the FTL may be executed by the processor 210.

The working memory 220 may include a namespace manager module 221, a wear leveling manager module 222, a garbage collection manager module 223, a mapping table manager module 224, and an address mapping table 225.

The working memory 220 may convert the logical address ADDR_L into a physical address by using the address mapping table 225 and provide the physical address to the nonvolatile memory 300. The working memory 220 may manage the memory cells of the nonvolatile memory 300. For example, the working memory 220 may perform garbage collection and wear leveling management operations on blocks of a memory cell array 310 of the nonvolatile memory 300.

The namespace manager module 221 may dynamically create a namespace in response to a user's request, that is, a namespace creation request command, from the host device 100. Here, the namespace manager module 221 may create a namespace by allocating a logical address region of a newly created namespace successively to a logical address region of a previously created namespace. The namespace manager module 221 may update the address mapping table 225 by requesting the mapping table manager module 224 during a namespace creation operation and a namespace deletion operation.

The wear leveling manager module 222 may manage a wear level of the nonvolatile memory 300 by adjusting a program/erase (P/E) cycle.

The memory controller 200 may control garbage collection of the nonvolatile memory 300 by using the garbage collection manager module 223. For example, the garbage collection manager module 223 may control garbage collection of the nonvolatile memory 300 by using metadata or the like.

Here, the garbage collection is performed to search for or secure free blocks in the nonvolatile memory 300. Since data is written on a page-by-page basis but erased on a block-by-block basis, an adjustment method may be utilized. Therefore, through the garbage collection, free blocks may be secured by writing a valid page to another block and erasing a block including a valid page. The performance of the storage device 10 can be improved through the control of the garbage collection.

The mapping table manager module 224 may update the address mapping table 225 by reflecting results of, for example, namespace creation/deletion, a wear leveling operation, a garbage collection operation, and the like.

The mapping table manager module 224 according to embodiments may receive the physical mapping command PMCMD (see FIG. 2) from the host device 100 and physically map a specific logical address exclusively to a specific physical address in response to the physical mapping command PMCMD. That is, the mapping table manager module 224 may prevent the physically mapped physical address from being mapped to other logical addresses unless the physical mapping is modified.

The mapping table manager module 224 according to some embodiments may map other physically unmapped logical addresses to physically unmapped physical addresses that can be efficiently mapped according to the results of the garbage collection operation and the wear leveling operation.

Referring to FIG. 4, the nonvolatile memory 300 may include the memory cell array 310, an address decoder 320, a voltage generator 330, a read/write circuit 340, and a control logic 350.

The memory cell array 310 may be connected to the address decoder 320 through word lines WL. The memory cell array 310 may be connected to the read/write circuit 340 through bit lines BL. The memory cell array 310 may include a plurality of memory cells. For example, memory cells arranged in a row direction may be connected to the word lines WL. For example, memory cells arranged in a column direction may be connected to the bit lines BL.

The address decoder 320 may be connected to the memory cell array 310 through the word lines WL. The address decoder 320 may operate in response to the control of the control logic 350. The address decoder 320 may receive addresses ADDR from the memory controller 200. The address decoder 320 may receive voltages utilized for program and read operations from the voltage generator 330.

The address decoder 320 may decode a row address among the received addresses ADDR. The address decoder 320 may select a word line WL using the decoded row address. A decoded column address DCA may be provided to the read/write circuit 340. For example, the address decoder 320 may include a row decoder, a column decoder, and an address buffer.

The voltage generator 330 may generate a voltage utilized for an access operation under the control of the control logic 350. For example, the voltage generator 330 may generate a program voltage and a program verify voltage used to perform a program operation. For example, the voltage generator 330 may generate read voltages used to perform a read operation and generate an erase voltage and an erase verify voltage used to perform an erase operation. In addition, the voltage generator 330 may provide a voltage used to perform each operation to the address decoder 320.

The read/write circuit 340 may be connected to the memory cell array 310 through the bit lines BL. The read/write circuit 340 may exchange the data DATA with the memory controller 200. The read/write circuit 340 may operate in response to the control of the control logic 350. The read/write circuit 340 may receive the decoded column address DCA from the address decoder 320. The read/write circuit 340 may select a bit line BL using the decoded column address DCA.

For example, the read/write circuit 340 may program the received data DATA to the memory cell array 310. The read/write circuit 340 may read data from the memory cell array 310 and provide the read data to an external device (e.g., the memory controller 200). For example, the read/write circuit 340 may include a sense amplifier, a write driver, a column select circuit, and a page buffer.

The control logic 350 may be connected to the address decoder 320, the voltage generator 330, and the read/write circuit 340. The control logic 350 may control the operation of the nonvolatile memory 300. The control logic 350 may operate in response to the control signal CTRL and the command CMD (e.g., a write command and a read command) received from the memory controller 200. The control logic 350 may perform garbage collection on the memory cell array 310 under the control of the memory controller 200.

Figure 5:
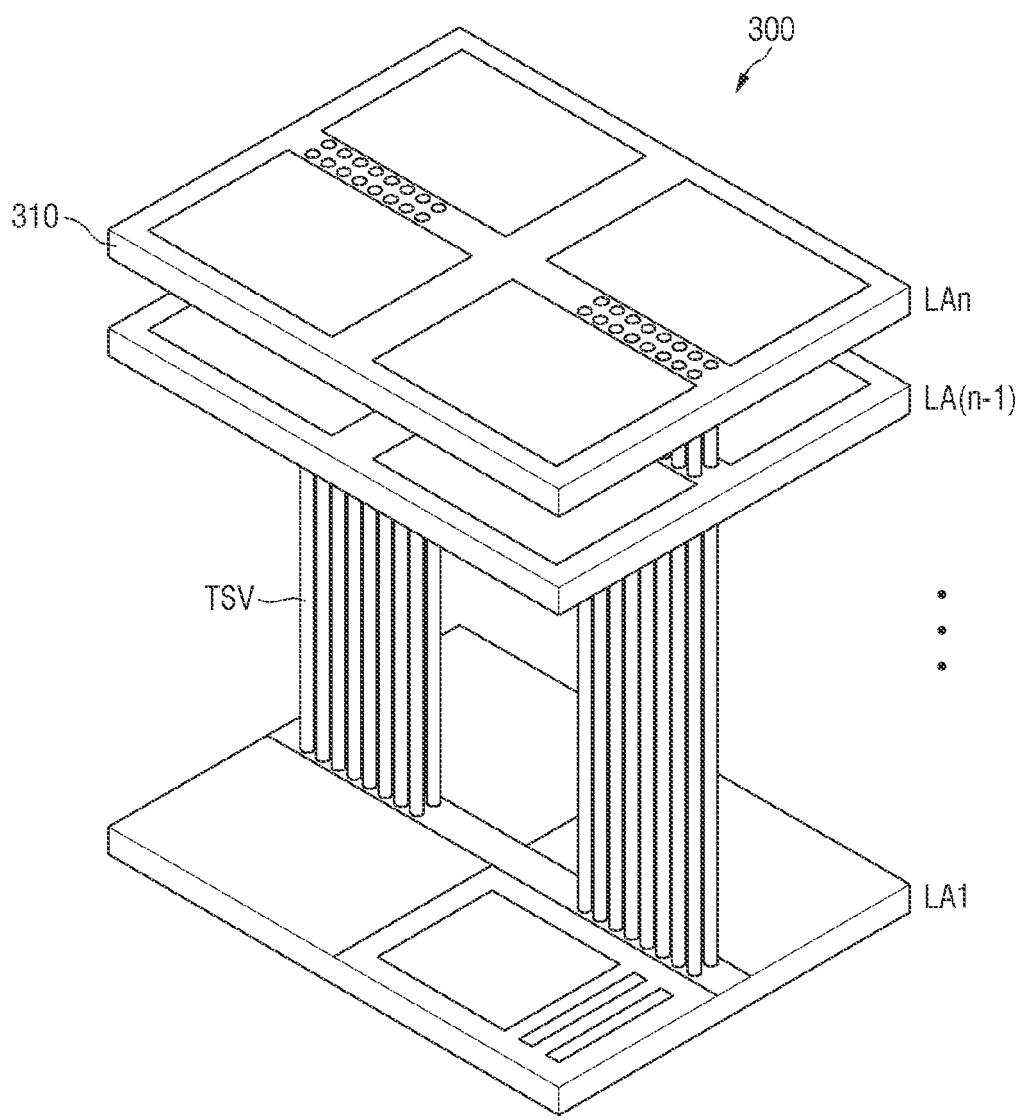
FIG. 5 is an exemplary perspective view of a nonvolatile memory according to embodiments of the present disclosure.

FIG. 5 is an exemplary perspective view of a nonvolatile memory 300 according to embodiments of the present disclosure.

Referring to FIGS. 4 and 5, the nonvolatile memory 300 according to some embodiments may include a plurality of semiconductor layers LA1 through LAn. Each of the semiconductor layers LA1 through LAn may be a memory chip (e.g., a DRAM memory chip). Alternatively, some of the semiconductor layers LA1 through LAn may be master chips which perform interfacing with an external device (e.g., the host device 100 of FIG. 1), and the other semiconductor layers LA1 through LAn may be slave chips which store data.

For example, an n$^{th}$ layer LAn and a first layer LA1 of the nonvolatile memory 300 may be semiconductor chips, each including a memory cell array 310. The semiconductor layers LA1 through LAn may transmit and receive signals to and from each other through through-silicon vias TSV. The configuration and arrangement of the nonvolatile memory 300 according to embodiments of the present disclosure are not limited to the above example.

Figure 6:
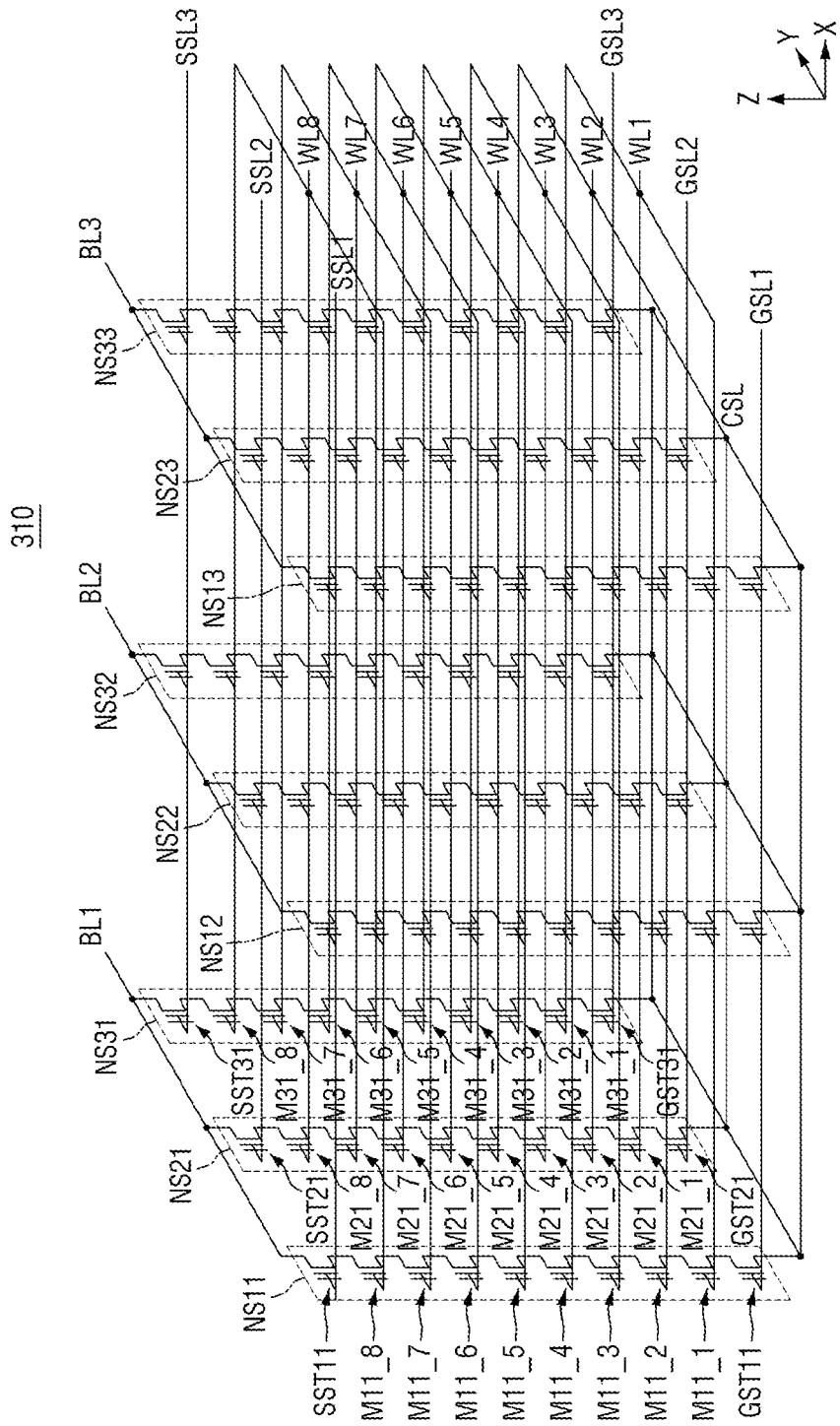
FIG. 6 is an exemplary circuit diagram of a memory cell array according to embodiments of the present disclosure.

FIG. 6 is an exemplary circuit diagram of a memory cell array 310 according to embodiments of the present disclosure.

Referring to FIG. 6, a plurality of cell strings NS11, NS21, NS31, NS12, NS22, NS32, NS13, NS23 and NS33 may be disposed on a substrate in a first direction x and a second direction y. The cell strings NS11, NS21, NS31, NS12, NS22, NS32, NS13, NS23 and NS33 may extend in a third direction z. The cell strings NS11, NS21, NS31, NS12, NS22, NS32, NS13, NS23 and NS33 may be connected in common to a common source line CSL formed on the substrate or in the substrate. Although the common source line CSL is connected to lowest ends of the cell strings NS11, NS21, NS31, NS12, NS22, NS32, NS13, NS23 and NS33 in the third direction z in FIG. 6, embodiments of the present disclosure are not limited thereto. For example, in some embodiments, the common source line CSL may be electrically connected to the lowest ends of the cell strings NS11, NS21, NS31, NS12, NS22, NS32, NS13, NS23 and NS33 in the third direction z, and the common source line CSL are not physically located at the bottom of the cell strings NS11, NS21, NS31, NS12, NS22, NS32, NS13, NS23 and NS33. In addition, although the cell strings NS11, NS21, NS31, NS12, NS22, NS32, NS13, NS23 and NS33 are arranged in a 3×3 array in FIG. 6, the arrangement and number of cell strings disposed in the nonvolatile memory cell array 310 are not limited thereto.

Some cell strings NS11, NS12 and NS13 may be connected to a first ground select line GSL1. Some cell strings NS21, NS22 and NS23 may be connected to a second ground select line GSL2. Some cell strings NS31, NS32 and NS33 may be connected to a third ground select line GSL3.

In addition, some cell strings NS11, NS12 and NS13 may be connected to a first string select line SSL1. Some cell strings NS21, NS22 and NS23 may be connected to a second string select line SSL2. Some cell strings NS31, NS32 and NS33 may be connected to a third string select line SSL3.

Each of the cell strings NS11, NS21, NS31, NS12, NS22, NS32, NS13, NS23 and NS33 may include a string select transistor SST connected to a string select line. In addition, each of the cell strings NS11, NS21, NS31, NS12, NS22, NS32, NS13, NS23 and NS33 may include a ground select transistor GST connected to a ground select line.

An end of the ground select transistor of each of the cell strings NS11, NS21, NS31, NS12, NS22, NS32, NS13, NS23 and NS33 may be connected to the common source line CSL. In addition, each of the cell strings NS11, NS21, NS31, NS12, NS22, NS32, NS13, NS23 and NS33 may include a plurality of memory cells sequentially stacked in the third direction z between the ground select transistor and the string select transistor. In some embodiments, each of the cell strings NS11, NS21, NS31, NS12, NS22, NS32, NS13, NS23 and NS33 may include dummy cells between the ground select transistor and the string select transistor. In addition, the number of string select transistors included in each string is not limited to the number illustrated in FIG. 6.

For example, the cell string NS11 may include a ground select transistor GST11 disposed at the bottom in the third direction z, a plurality of memory cells M11_1 through M11_8 sequentially stacked on the ground select transistor GST11 in the third direction z, and a string select transistor SST11 stacked on the uppermost memory cell M11_8 in the third direction z. In addition, the cell string NS21 may include a ground select transistor GST21 disposed at the bottom in the third direction z, a plurality of memory cells M21_1 through M21_8 sequentially stacked on the ground select transistor GST21 in the third direction z, and a string select transistor SST21 stacked on the uppermost memory cell M21_8 in the third direction z. In addition, the cell string NS31 may include a ground select transistor GST31 disposed at the bottom in the third direction z, a plurality of memory cells M31_1 through M31_8 sequentially stacked on the ground select transistor GST31 in the third direction z, and a string select transistor SST31 stacked on the uppermost memory cell M31_8 in the third direction z. Other strings may also be configured in a similar manner.

Memory cells located at the same height in the third direction z from the substrate or the ground select transistors may be electrically connected in common through a word line. For example, memory cells at a height where the memory cells M11_1, M21_1 and M31_1 are formed may be connected to a first word line WL1. In addition, memory cells at a height where the memory cells M11_2, M21_2 and M31_2 are formed may be connected to a second word line WL2. The arrangement and structure of memory cells connected to third through eighth word lines WL3 through WL8 are also similar to the above example, and thus, will not be described.

An end of the string select transistor of each of the cell strings NS11, NS21, NS31, NS12, NS22, NS32, NS13, NS23 and NS33 may be connected to a bit line BL1, BL2 or BL3. For example, the string select transistors ST11, SST21 and SST31 may be connected to the bit line BL1 extending in the second direction y. A description of other string select transistors connected to the bit lines BL2 and BL3 is similar to the above description, and thus, will be omitted.

Memory cells corresponding to one string (or ground) select line and one word line may form one page. A write operation and a read operation may be performed on a page-by-page basis. Each memory cell of each page may store two or more bits. The bits written to the memory cells of each page may form logical pages.

The memory cell array 310 may be provided as a 3D memory array. In the 3D memory array, arrays of memory cells having an active region disposed on a substrate and a circuit related to the operation of the memory cells are monolithically formed at one or more physical levels. The circuit related to the operation of the memory cells may be located in the substrate or on the substrate. The term "monolithically formed" denotes that layers at each level of a 3D array are directly deposited on layers at a lower level of the 3D array. Alternatively, the circuit related to the operation of the memory cells may be connected to a contact part at the top in the third direction z. This will be described in detail with reference to FIG. 7.

Figure 7:
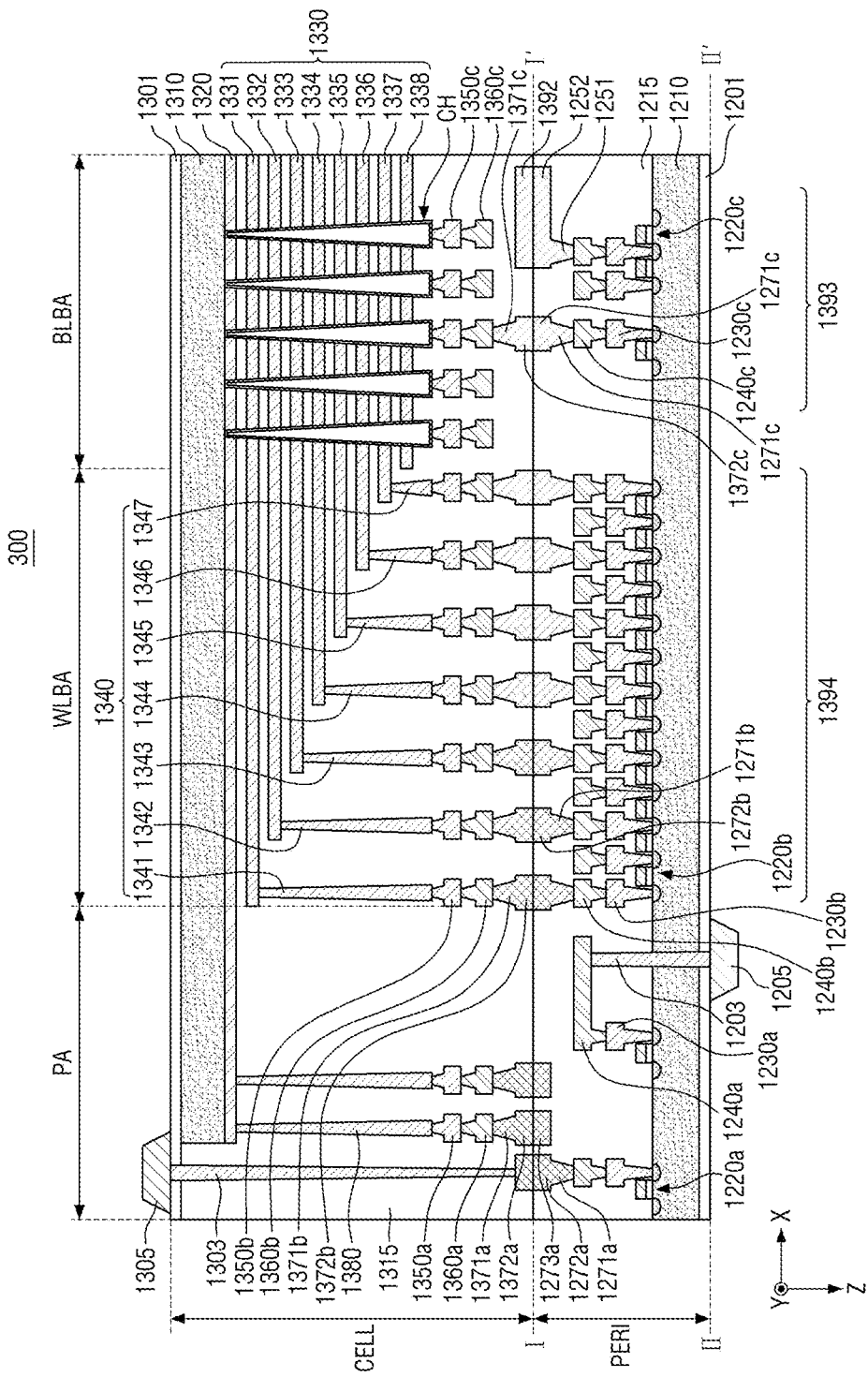
FIG. 7 schematically illustrates the inside of a nonvolatile memory according to embodiments of the present disclosure.

FIG. 7 schematically illustrates the inside of a nonvolatile memory 300 according to embodiments of the present disclosure.

Referring to FIG. 7, the nonvolatile memory 300 according to embodiments of the present disclosure may have a chip-to-chip (C2C) structure. In FIG. 7, a cell area CELL of the nonvolatile memory 300 may correspond to the memory cell array 310 of FIG. 5.

The C2C structure may be formed by manufacturing an upper chip including the cell area CELL on a first wafer, manufacturing a lower chip including a peripheral circuit area PERI on a second wafer different from the first wafer, and then connecting the upper chip and the lower chip using a bonding method. For example, the bonding method may refer to a method of electrically connecting a bonding metal formed on an uppermost metal layer of the upper chip and a bonding metal formed on an uppermost metal layer of the lower chip. For example, when the bonding metals are made of copper (Cu), the bonding method may be a Cu—Cu bonding method. The bonding metals may also be made of aluminum or tungsten.

Each of the peripheral circuit area PERI and the cell area CELL of the nonvolatile memory 300 according to embodiments of the present disclosure may include an external pad bonding area PA, a word line bonding area WLBA, and a bit line bonding area BLBA.

The peripheral circuit area PERI may include a first substrate 1210, an interlayer insulating layer 1215, a plurality of circuit elements 1220a through 1220c formed on the first substrate 1210, first metal layers 1230a through 1230c respectively connected to the circuit elements 1220a through 1220c, and second metal layers 1240a through 1240c formed on the first metal layers 1230a through 1230c. In an embodiment, the first metal layers 1230a through 1230c may be made of tungsten having a relatively high resistance, and the second metal layers 1240a through 1240c may be made of copper having a relatively low resistance.

Although only the first metal layers 1230a through 1230c and the second metal layers 1240a through 1240c are illustrated and described herein, embodiments of the present disclosure are not limited thereto. For example, in some embodiments, one or more metal layers may also be further formed on the second metal layers 1240a through 1240c. At least some of the metal layers formed on the second metal layers 1240a through 1240c may be made of aluminum having a lower resistance than copper that forms the second metal layers 1240a through 1240c.

The interlayer insulating layer 1215 may be disposed on the first substrate 1210 to cover the circuit elements 1220a through 1220c, the first metal layers 1230a through 1230c and the second metal layers 1240a through 1240c, and may include an insulating material such as, for example, silicon oxide or silicon nitride.

Lower bonding metals 1271b and 1272b may be formed on the second metal layers 1240b of the word line bonding area WLBA. In the word line bonding area WLBA, the lower bonding metals 1271b and 1272b of the peripheral circuit area PERI may be electrically connected to upper bonding metals 1371b and 1372b of the cell area CELL by a bonding method, and the lower bonding metals 1271b and 1272b and the upper bonding metals 1371b and 1372b may be made of, for example, aluminum, copper or tungsten.

The cell area CELL may provide at least one memory block. The cell area CELL may include a second substrate 1310 and a common source line 1320 (corresponding to CSL of FIG. 5). A plurality of word lines 1331 through 1338 (1330, corresponding to WL1 through WL8 of FIG. 5) may be stacked on the second substrate 1310 along the third direction z perpendicular to an upper surface of the second substrate 1310. String select lines and a ground select line may be disposed on and under the word lines 1330, respectively, and the word lines 1330 may be disposed between the string select lines and the ground select line.

In the bit line bonding area BLBA, channel structures CH may extend in the direction perpendicular to the upper surface of the second substrate 1310 to penetrate the word lines 1330, the string select lines, and the ground select line. Each of the channel structures CH may include a data storage layer, a channel layer and a buried insulating layer, and the channel layer may be electrically connected to a first metal layer 1350c and a second metal layer 1360c. For example, the first metal layer 1350c may be a bit line contact, and the second metal layer 1360c may be a bit line (corresponding to BL1 through BL3 of FIG. 5). In an embodiment, the bit line 1360c may extend along the second direction y parallel to the upper surface of the second substrate 1310.

In the embodiment illustrated in FIG. 7, an area where the channel structures CH and the bit lines 1360c are disposed may be defined as the bit line bonding area BLBA. In the bit line bonding area BLBA, one of the bit lines 1360c may be electrically connected to the circuit elements 1220c which provide a page buffer 1393 in the peripheral circuit area PERI. For example, one of the bit lines 1360c may be connected to upper bonding metals 1371c and 1372c in the peripheral circuit area PERI, and the upper bonding metals 1371c and 1372c may be connected to lower bonding metals 1271c and 1272c connected to the circuit elements 1220c of the page buffer 1393.

In the word line bonding area WLBA, the word lines 1330 may extend along the first direction x parallel to the upper surface of the second substrate 1310 and may be connected to a plurality of cell contact plugs 1341 through 1347 (1340). The word lines 1330 and the cell contact plugs 1340 may be connected to each other by pads provided by at least some of the word lines 1330 which extend to different lengths along the first direction x. First metal layers 1350b and second metal layers 1360b may be sequentially connected onto the cell contact plugs 1340 connected to the word lines 1330. In the word line bonding area WLBA, the cell contact plugs 1340 may be connected to the peripheral circuit area PERI through the upper bonding metals 1371b and 1372b of the cell area CELL and the lower bonding metals 1271b and 1272b of the peripheral circuit area PERI.

The cell contact plugs 1340 may be electrically connected to the circuit elements 1220b which provide a row decoder 1394 in the peripheral circuit area PERI. In an embodiment, an operating voltage of the circuit elements 1220b which provide the row decoder 1394 may be different from an operating voltage of the circuit elements 1220c which provide the page buffer 1393. For example, the operating voltage of the circuit elements 1220c which provide the page buffer 1393 may be greater than the operating voltage of the circuit elements 1220b which provide the row decoder 1394.

Common source line contact plugs 1380 may be disposed in the external pad bonding area PA. The common source line contact plugs 1380 may be made of a conductive material such as, for example, a metal, a metal compound or polysilicon, and may be electrically connected to the common source line 1320. First metal layers 1350a and second metal layers 1360a may be sequentially stacked on the common source line contact plugs 1380. For example, an area where the common source line contact plugs 1380, the first metal layers 1350a, and the second metal layers 1360a are disposed may be defined as the external pad bonding area PA.

Input/output pads 1205 and 1305 may be disposed in the external pad bonding area PA. Referring to FIG. 7, a lower insulating layer 1201 may be formed under the first substrate 1210 to cover a lower surface of the first substrate 1210, and a first input/output pad 1205 may be formed on the lower insulating layer 1201. The first input/output pad 1205 may be connected to at least one of the circuit elements 1220a through 1220c disposed in the peripheral circuit area PERI through a first input/output contact plug 1203 and may be separated from the first substrate 1210 by the lower insulating layer 1201. In addition, a side insulating layer may be disposed between the first input/output contact plug 1203 and the first substrate 1210 to electrically separate the first input/output contact plug 1203 and the first substrate 1210.

Referring still to FIG. 7, an upper insulating layer 1301 may be formed on the second substrate 1310 to cover the upper surface of the second substrate 1310, and a second input/output pad 1305 may be disposed on the upper insulating layer 1301. The second input/output pad 1305 may be connected to at least one of the circuit elements 1220a through 1220c disposed in the peripheral circuit area PERI through a second input/output contact plug 1303.

According to embodiments, the second substrate 1310 and the common source line 1320 are not disposed in an area where the second input/output contact plug 1303 is disposed. In addition, according to embodiments, the second input/output pad 1305 does not overlap the word lines 1330 in the third direction z. Referring to FIG. 7, the second input/output contact plug 1303 may be separated from the second substrate 1310 in a direction parallel to the upper surface of the second substrate 1310, and may penetrate an interlayer insulating layer 1315 of the cell area CELL and be connected to the second input/output pad 1305.

According to embodiments, the first input/output pad 1205 and the second input/output pad 1305 may be selectively formed. For example, the nonvolatile memory 300 according to some embodiments may include only the first input/output pad 1205 disposed on the first substrate 1210 or may include only the second input/output pad 1305 disposed on the second substrate 1310. Alternatively, the nonvolatile memory 300 may include both the first input/output pad 1205 and the second input/output pad 1305.

In each of the external pad bonding area PA and the bit line bonding area BLBA included in each of the cell area CELL and the peripheral circuit area PERI, a metal pattern of an uppermost metal layer may exist as a dummy pattern, or the upper metal layer may be empty.

In the external pad bonding area PA of the nonvolatile memory 300 according to embodiments of the present disclosure, lower metal patterns 1273a having the same shape as upper metal patterns 1372a of the cell area CELL may be formed in an uppermost metal layer of the peripheral circuit area PERI to correspond to the upper metal patterns 1372a formed in an uppermost metal layer of the cell area CELL. According to embodiments, the lower metal patterns 1273a formed in the uppermost metal layer of the peripheral circuit area PERI are not connected to separate contacts in the peripheral circuit area PERI. Similarly, in the external pad bonding area PA, upper metal patterns having the same shape as lower metal patterns of the peripheral circuit area PERI may be formed in the uppermost metal layer of the cell area CELL to correspond to the lower metal patterns formed in the uppermost metal layer of the peripheral circuit area PERI.

The lower bonding metals 1271b and 1272b may be formed on the second metal layers 1240b of the word line bonding area WLBA. In the word line bonding area WLBA, the lower bonding metals 1271b and 1272b of the peripheral circuit area PERI may be electrically connected to the upper bonding metals 1371b and 1372b of the cell area CELL by a bonding method.

In addition, in the bit line bonding area BLBA, an upper metal pattern 1392 having the same shape as a lower metal pattern 1252 of the peripheral circuit area PERI may be formed in the uppermost metal layer of the cell area CELL to correspond to the lower metal pattern 1252 formed in the uppermost metal layer of the peripheral circuit area PERI. According to embodiments, a contact is not formed on the upper metal pattern 1392 formed in the uppermost metal layer of the cell area CELL.

Figure 8:
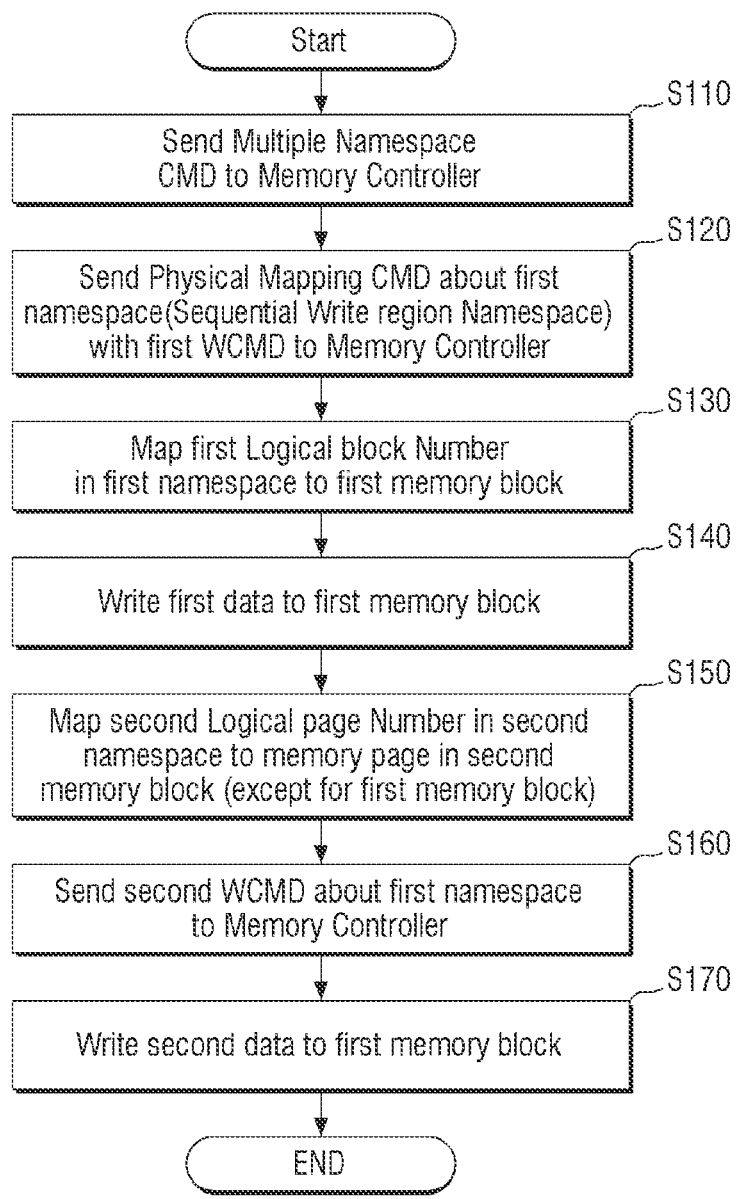
FIGS. 8 and 9 are diagrams illustrating a method of operating a storage device according to embodiments of the present disclosure.
Figure 9:
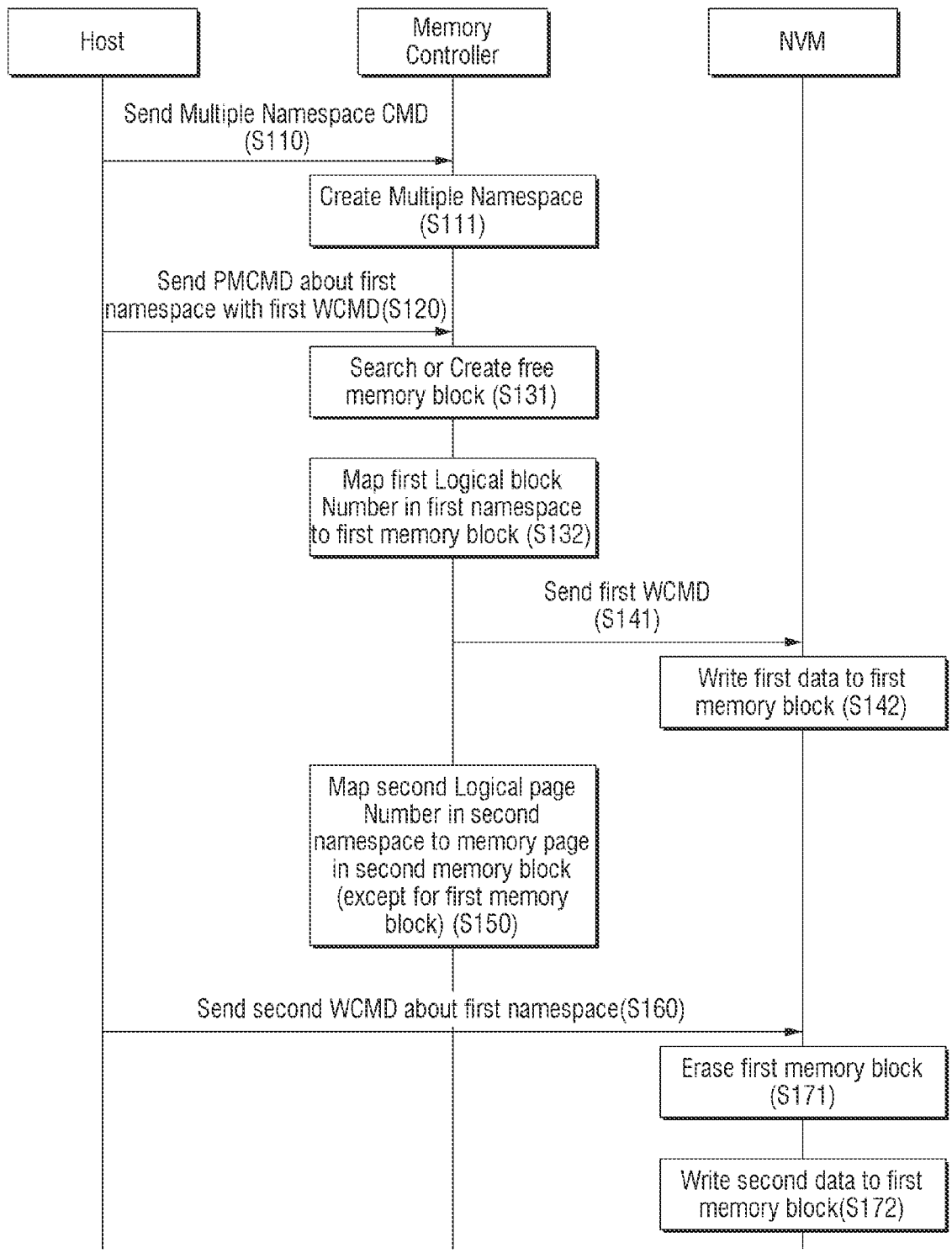
Figure 10:
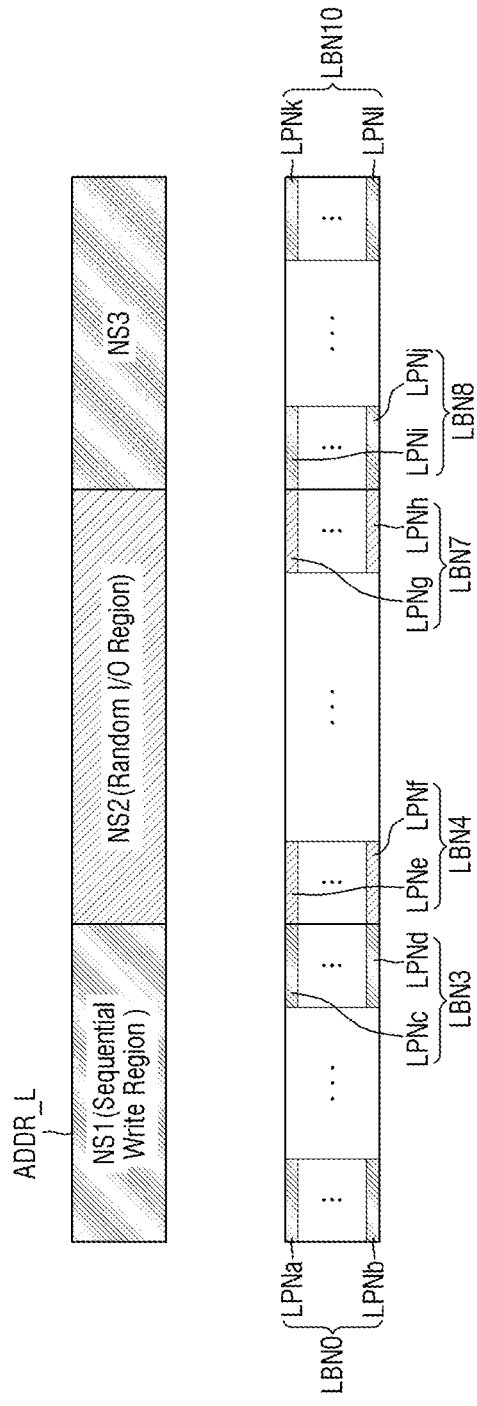
FIG. 10 illustrates a logical address region used in an electronic system according to embodiments of the present disclosure.
Figure 11:
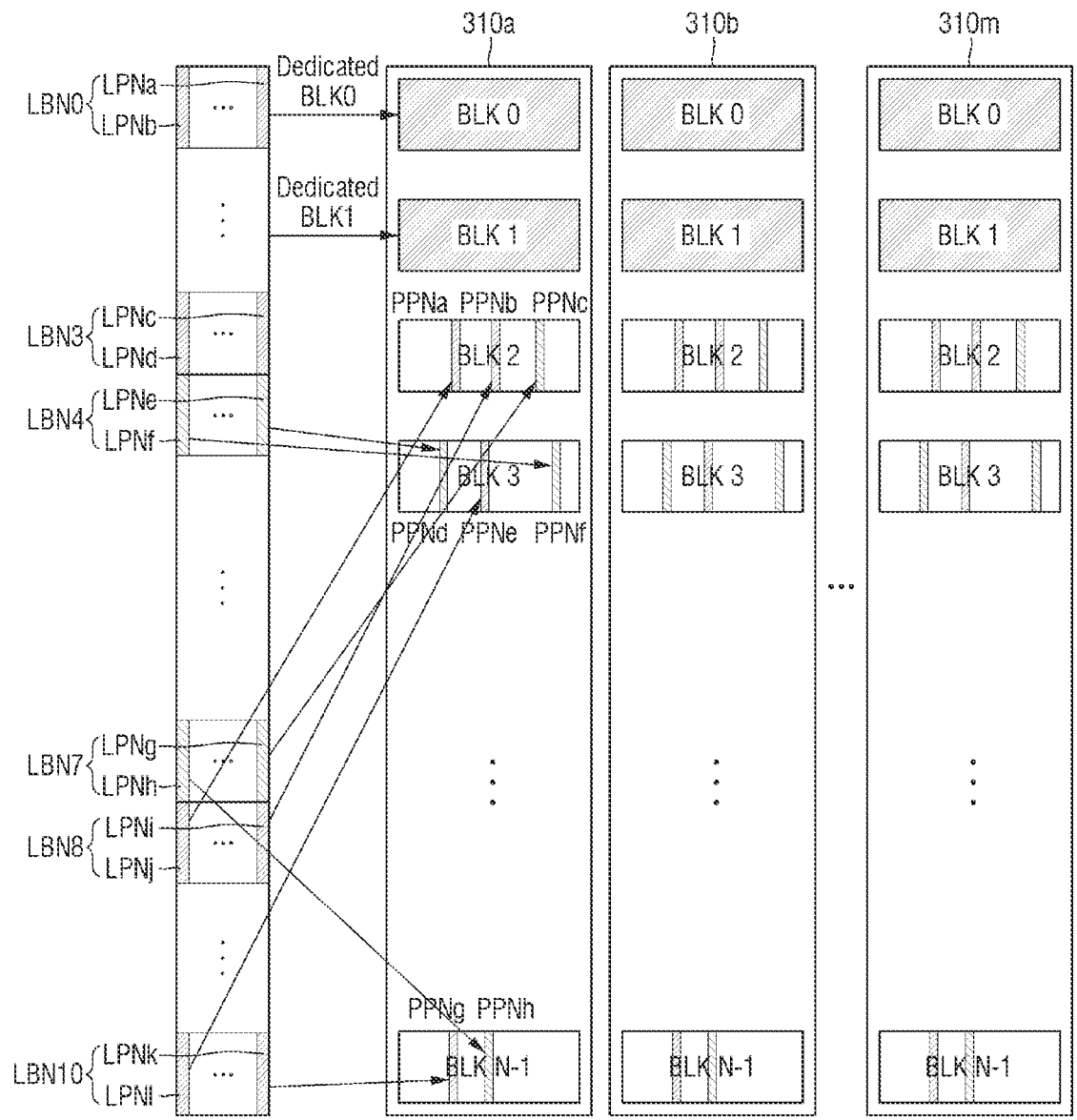
FIG. 11 is a diagram for explaining hybrid mapping, in which physical mapping and logical mapping are used together, in the electronic system according to the embodiments of FIG. 10.

FIGS. 8 and 9 are diagrams illustrating a method of operating a storage device according to embodiments of the present disclosure. FIG. 10 illustrates a logical address region ADDR_L used in an electronic system according to embodiments of the present disclosure. FIG. 11 is a diagram for explaining hybrid mapping, in which physical mapping and logical mapping are used together, in the electronic system according to embodiments of the present disclosure. FIG. 12 illustrates a mapping table MT corresponding to the mapping of FIG. 11.

Referring to FIGS. 8 and 9, a host sends a command for requesting creation of a plurality of namespaces to a memory controller (operation S110). Referring to FIG. 10, the logical address region ADDR_L used in the electronic system according to some embodiments may include a first namespace NS1, a second namespace NS2, and a third namespace NS3. A logical address region of the first namespace may be a logical address region in which sequential write is performed, a logical address region of the second namespace NS2 may be a logical address region in which random write is performed, and a logical address region of the third namespace NS3 may be a logical address region which is classified for other uses. The logical address region of the first namespace NS1 may be used for sequential write access such as a sequentialized pattern or backup, and the logical address region of the second namespace NS2 may be used for metadata write or random write access such as journaling.

The first namespace NS1 may include zero$^{th}$ through third logical block numbers LBN0 through LBN3, the second namespace NS2 may include fourth through seventh logical block numbers LBN4 through LBN7, and the third namespace NS3 may include eighth through tenth logical block numbers LBN8 through LBN10. The zero$^{th}$ logical block number LBN0 may include a$^{th}$ through b$^{th}$ logical page numbers LPNa through LPNb, the third logical block number LBN3 may include c$^{th}$ through d$^{th}$ logical page numbers LPNc through LPNd, the fourth logical block number LBN4 may include e$^{th}$ through f$^{th}$ logical page numbers LPNe through LPNf, the seventh logical block number LBN7 may include g$^{th}$ through h$^{th}$ logical page numbers LPNg through LPNh, the eighth logical block number LBN8 may include i$^{th}$ through j$^{th}$ logical page numbers LPNi through LPNj, and the tenth logical block number LBN10 may include k$^{th}$ through l$^{th}$ logical page numbers LPNk through LPNl. The above number and arrangement of logical block numbers and the number and arrangement of logical page numbers allocated to each namespace are only an example used to explain that each namespace includes a plurality of logical block numbers/logical page numbers, and embodiments of the present disclosure are not limited to the above example number or arrangement. The number of logical block numbers/logical page numbers is a natural number of 1 or more.

Referring also to FIG. 3, a namespace manager module 221 in the memory controller 200 (see FIG. 2) may receive inclusion relationships between namespaces and logical block numbers/logical page numbers from the host device 100 together with a command for requesting creation of the first through third namespaces NS1 through NS3, and may create the first through third namespaces NS1 through NS3 by reflecting the inclusion relationships of FIG. 10 (operation S111).

The host device 100 sends a physical mapping command for the first namespace NS1 to the memory controller 200 together with a first write command for the first namespace NS1 (operation S120).

Referring to FIG. 11, the memory controller 200 physically maps the logical block numbers LBN0 through LBN3 in the first namespace NS1 to zero$^{th}$ and first memory blocks BLK 0 and BLK 1 (operation S130).

To perform the physical mapping (operation S130), a garbage collection manager module 223 in the memory controller 200 may search for or create a plurality of free blocks according to the size of data DATA to be written by the first write command (operation S131). When the physical mapping command is received, if the size of data that can be accommodated in the free blocks in an erased state is larger than the size of the data DATA to be written, the garbage collection manager module 223 may search for the zero$^{th}$ and first memory blocks BLK 0 through BLK 1 to be physically mapped. When the physical mapping command is received, if the size of data that can be accommodated in the free blocks in the erased state is smaller than the size of the data DATA to be written, the garbage collection manager module 223 may perform garbage collection to erase some blocks, thereby additionally creating free blocks.

A mapping table manager module 224 may physically map the logical block numbers LBN0 through LBN3 in the first namespace NS1 to the zero$^{th}$ and first memory blocks BLK 0 and BLK 1 which are free blocks (operation S132).

In response to the physical mapping command, the mapping table manager module 224 maps the logical block numbers LBN0 through LBN3 in the first namespace NS1 exclusively to the zero$^{th}$ and first memory blocks BLK 0 and BLK1. Accordingly, the logical block numbers LBN0 through LBN3 may be mapped exclusively to the zero$^{th}$ and first memory blocks BLK 0 and BLK 1.

Therefore, referring also to FIG. 12, the mapping table manager module 224 may prevent the zero$^{th}$ and first memory blocks BLK 0 and BLK 1 from being mapped to other logical block numbers LBN4 through LBN10 unless the physical mapping is modified and may store the above mapping information in the address mapping table 225 (MT).

The mapping table manager module 224 according to embodiments may logically map the logical block numbers LBN4 through LBN10 to second through (N−1)$^{th}$ memory blocks BLK 2 through BLK N−1 that can be efficiently mapped according to the results of a garbage collection operation and a wear leveling operation. The logical mapping will be described later.

The number of physically mapped blocks according to embodiments may be determined by the number of memory cell arrays 310a through 310m. When a nonvolatile memory 300 includes a plurality of memory cell arrays 310a through 310m, the memory cell arrays 310a through 310m may operate in parallel according to an embodiment. Therefore, since the zero$^{th}$ and first memory blocks BLK 0 and BLK 1 in each of the m memory cell arrays 310a through 310m are physically mapped, the number of physically mapped memory blocks in the nonvolatile memory 300 is 2 m which is a multiple of m (where m is a natural number of 1 or more). However, the number of physically mapped memory blocks in one memory cell array 310 may vary according to embodiments of the present disclosure.

A first write operation is performed on the zero$^{th}$ and first memory blocks BLK 0 and BLK 1 (operation S140).

To perform the first write operation (S140), the memory controller 200 sends the first write command for the zero$^{th}$ and first memory blocks BLK 0 and BLK 1 to a control logic 350 (operation S142). In response to the first write command (operation S141), the control logic 350 performs the first write operation on the zero$^{th}$ and first memory blocks BLK 0 and BLK 1 (operation S142).

The first write operation (operation S140) may correspond to a sequential write to the first namespace NS1.

Referring to FIGS. 11 and 12, the memory controller 200 logically maps logical page numbers in the second and third namespaces NS2 and NS3 to memory pages in the second through (N−1)$^{th}$ memory blocks BLK 2 through BLK N−1 (operation S150).

The logical mapping may be non-exclusively performed on a wide area, except for physically mapped physical addresses, according to the results of the garbage collection operation and the wear leveling operation without reception of a separate command related to a mapping attribute from the host device 100. Due to the above characteristics, some embodiments may utilize page-by-page mapping instead of block-by-block mapping in the logical mapping. When a write command for the second and third namespaces NS2 and NS3 is received, random write may be performed instead of sequential write.

For example, the j$^{th}$ logical page number LPNj included in the third namespace NS3 may be mapped to an a$^{th}$ physical page number PPNa in the second memory block BLK 2, the $i^{th}$ logical page number LPNi included in the third namespace NS3 may be mapped to a $b^{th}$ physical page number PPNb in the second memory block BLK 2, and the $g^{th}$ logical page number LPNg included in the second namespace NS2 may be mapped to a $c^{th}$ physical page number PPNc in the same second memory block BLK 2.

Then, the above mapping information may be updated by the garbage collection operation and the wear leveling operation due to the nature of the logical mapping. Therefore, mapping information of the $i^{th}$ logical page number LPNi to the $b^{th}$ physical page number PPNb and the $g^{th}$ logical page number LPNg to the $c^{th}$ physical page number PPNc may be updated by a subsequent logical mapping operation. Thus, a mapping operation different from mapping information of the $g^{th}$ logical page number LPNg to the $c^{th}$ physical page number PPNc may be performed.

The $e^{th}$ logical page number LPNe included in the second namespace NS2 may be mapped to a $d^{th}$ physical page number PPNd in the third memory block BLK 3, the $l^{th}$ logical page number LPNl included in the third namespace NS3 may be mapped to an $e^{th}$ physical page number PPNe in the same third memory block BLK 3, and the $f^{th}$ logical page number LPNf included in the second namespace NS2 may be mapped to an $f^{th}$ physical page number PPNf in the same third memory block BLK 3.

The $k^{th}$ logical page number LPNk included in the third namespace NS3 may be mapped to a $g^{th}$ physical page number PPNg in the $(N-1)^{th}$ memory block BLK N-1, and the $h^{th}$ logical page number LPNh included in the second namespace NS2 may be mapped to an $h^{th}$ physical page number PPNh in the same $(N-1)^{th}$ memory block BLK N-1.

Although the logical mapping (operation S150) is performed after the physical mapping (operation S130) in the drawings, this is only an example, and embodiments of the present disclosure are not limited to the above mapping order.

The host device 100 sends a second write command for the first namespace NS1 to the memory controller 200 (operation S160) after sending the first write command (operation S120). A separate mapping operation is not performed unlike in the sending of the first write command (operation S120).

A second write operation is performed on the $zero^{th}$ and first memory blocks BLK 0 and BLK 1 (operation S170).

To perform the second write operation (operation S170), an erase operation is performed on the first and second memory blocks BLK 0 and BLK 1 (operation S171). In response to the erase operation (operation S171), the control logic 350 performs the second write operation on the $zero^{th}$ and first memory blocks BLK 0 and BLK 1 (operation S172).

The second write operation (operation S170) may correspond to a sequential write to the first namespace NS1.

Figure 13:
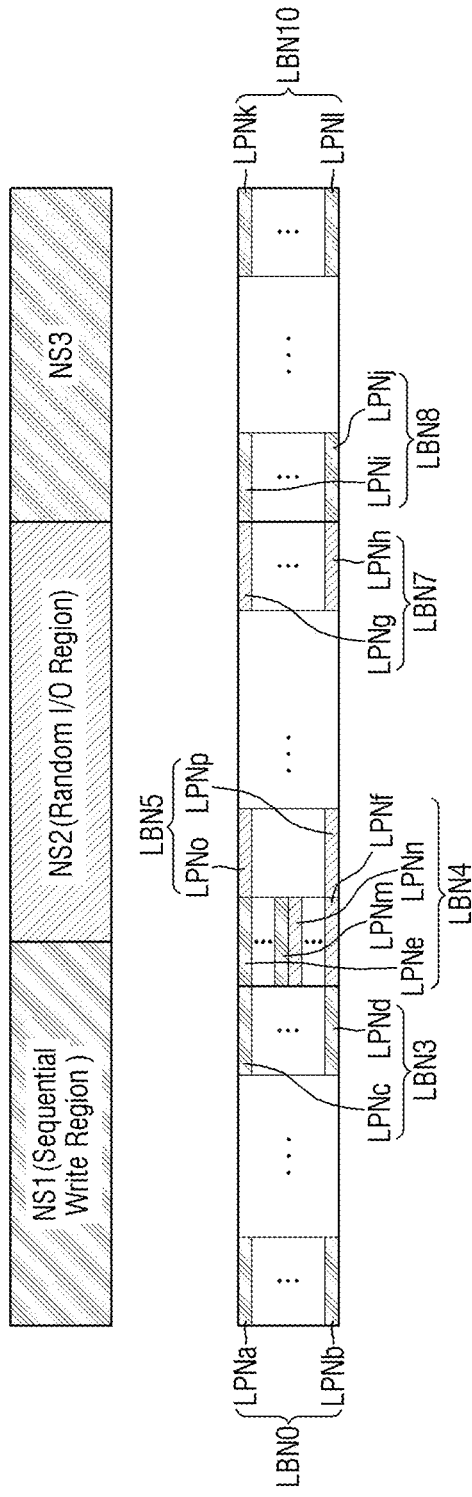
FIG. 13 illustrates a logical address region used in an electronic system according to embodiments of the present disclosure.
Figure 14:
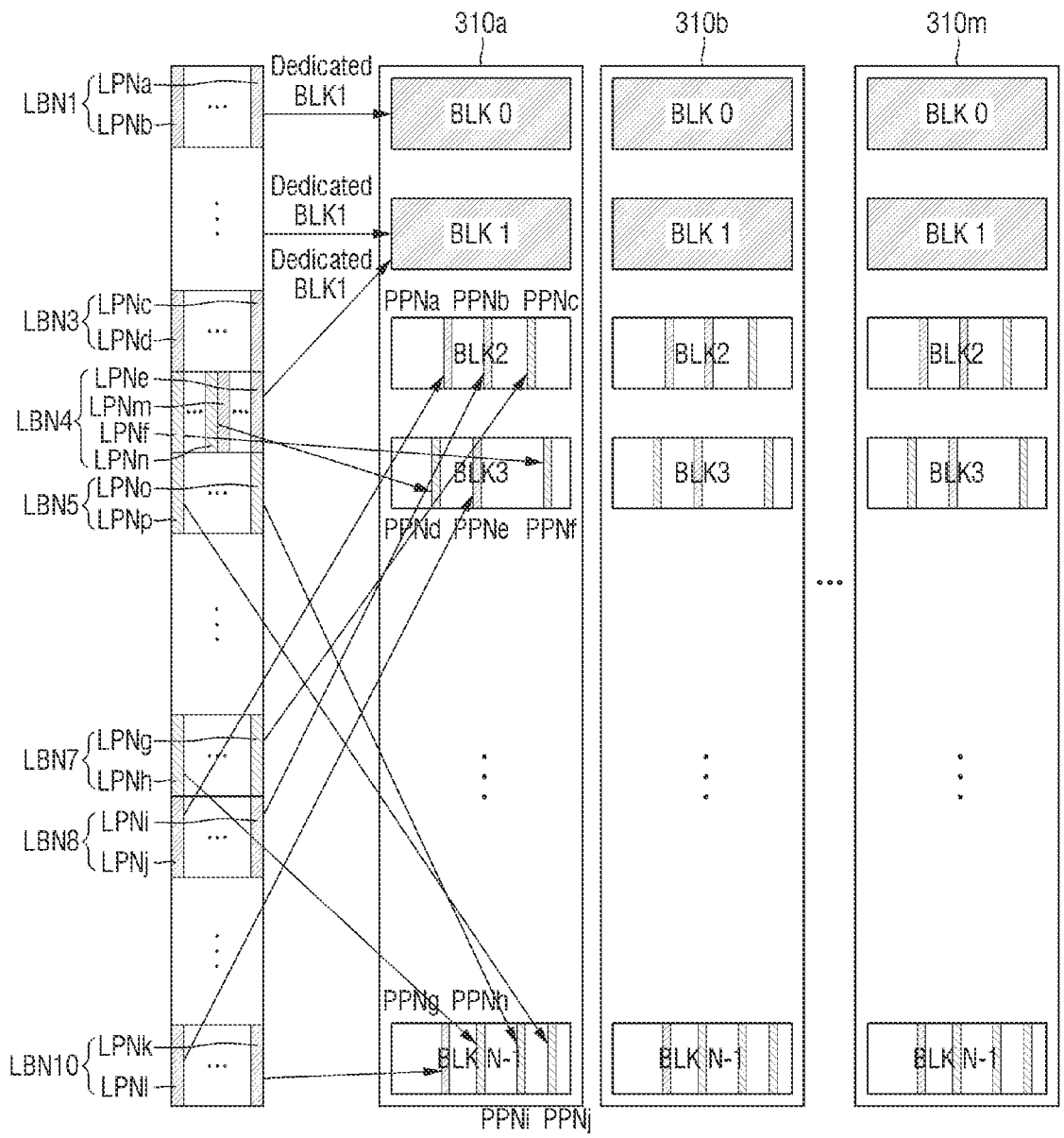
FIG. 14 illustrates hybrid mapping used in the electronic system according to the embodiments of FIG. 13.

FIG. 13 illustrates a logical address region used in an electronic system according to embodiments of the present disclosure. FIG. 14 illustrates hybrid mapping used in the electronic system according to embodiments of the present disclosure.

The electronic system according to embodiments of the present disclosure will now be described with reference to FIGS. 13 and 14. The following description will focus on differences from the electronic system illustrated in FIGS. 10 and 11, and for convenience of explanation, a further description of components and technical aspects previously described will be omitted.

A first namespace NS1 includes an $e^{th}$ logical page number LPNe and an $m^{th}$ logical page number LPNm in a fourth logical block number LBN4. Thus, the first namespace NS1 may include logical page numbers as well as logical block numbers.

The other logical page numbers LPNn and LPNf in the fourth logical block number LBN4 may be included in a second namespace NS2.

Therefore, when physical mapping is performed on the first namespace NS1, a mapping table manager module 224 maps the $e^{th}$ logical page number LPNe and the $m^{th}$ logical page number LPNm in the fourth logical block number LBN4 exclusively to $zero^{th}$ and first memory blocks BLK 0 and BLK 1.

Figure 15:
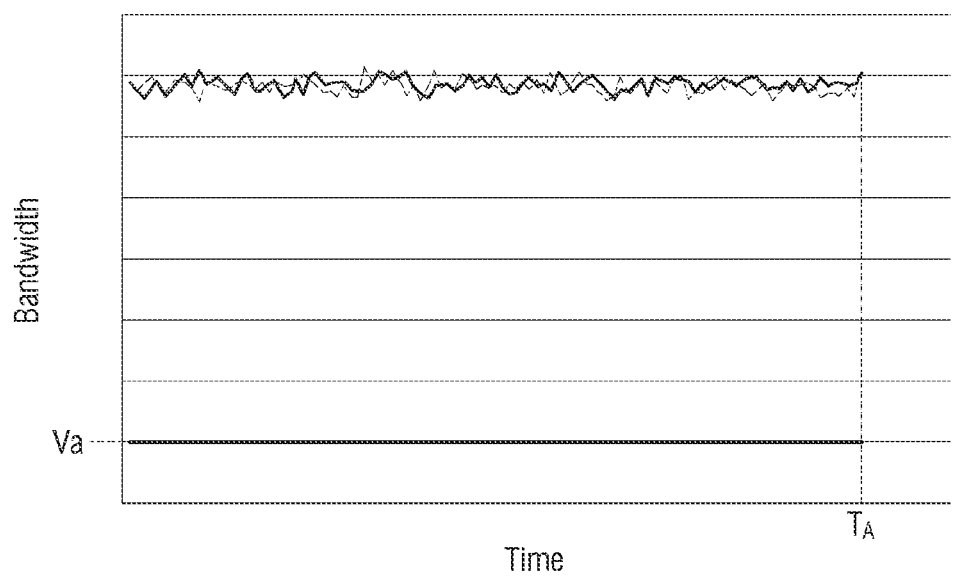
FIGS. 15 through 17 are graphs for explaining effects of an electronic system according to embodiments of the present disclosure.
Figure 16:
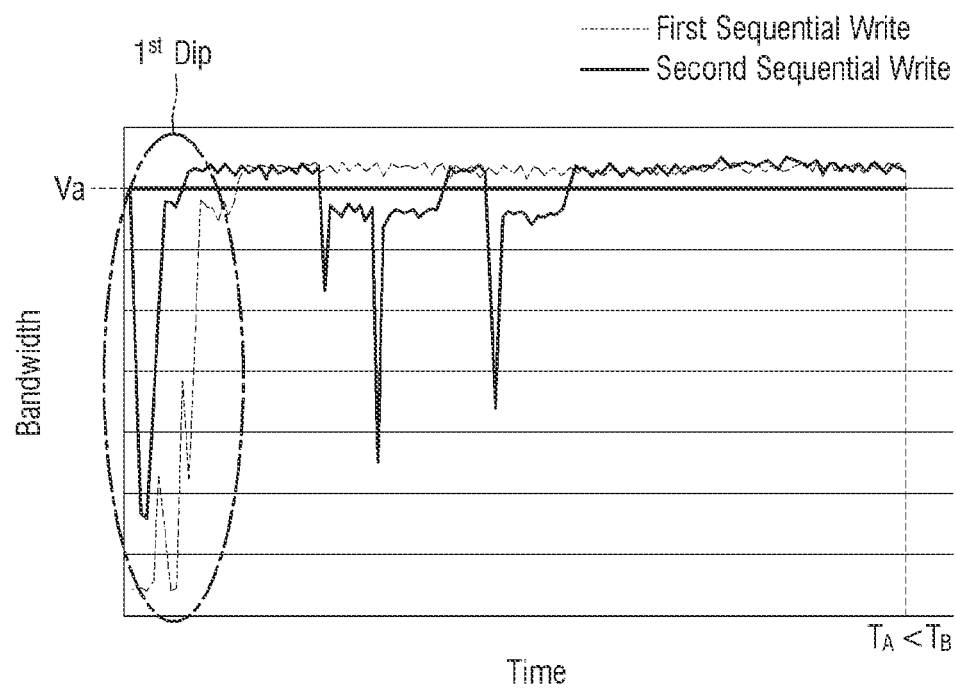
Figure 17:
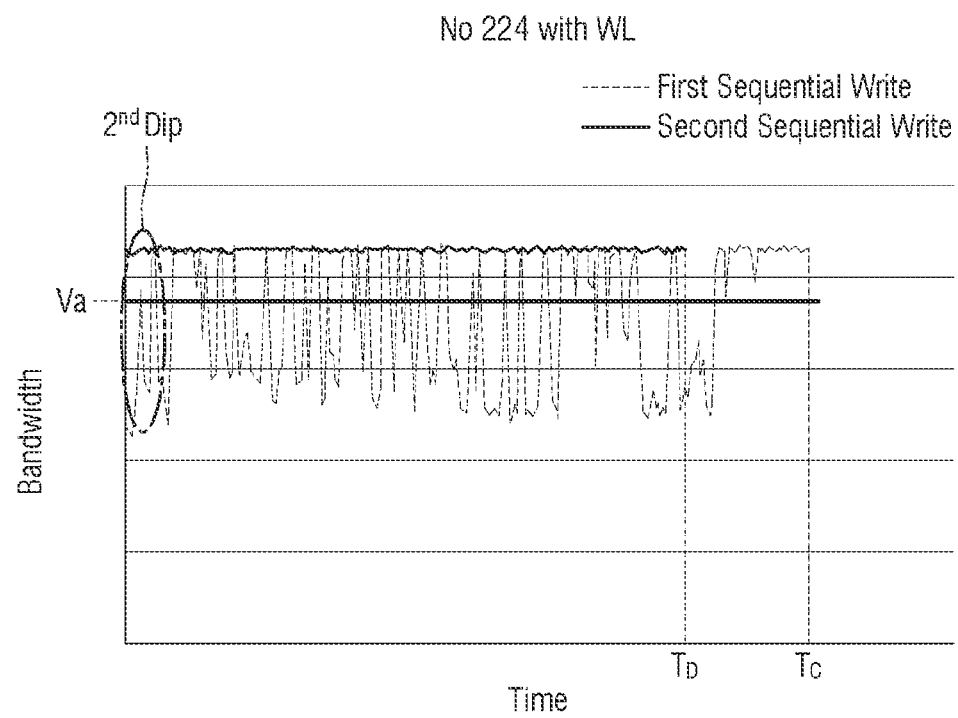

FIGS. 15 through 17 are graphs for explaining effects of an electronic system according to embodiments of the present disclosure.

FIG. 15 is a graph illustrating the sequential write speed of a storage device 10 which performs physical mapping on a namespace to which sequential write is applied, like a mapping table manager module 244 of the current embodiment.

FIG. 16 is a graph illustrating the sequential write speed of a storage device which performs garbage collection GC and logical mapping on a namespace to which sequential write is applied.

FIG. 17 is a graph illustrating the sequential write speed of a storage device which performs wear leveling WL and logical mapping on a namespace to which sequential write is applied.

Referring to FIG. 15, it can be seen that the storage device 10 of an embodiment according to the present disclosure is written at a speed higher than an appropriate write speed Va during both a first sequential write and a second sequential write (an operation after the first sequential write). Accordingly, an end time of each of the first sequential write and the second sequential write is a first time Ta.

Referring to FIG. 16, it can be seen that the storage device which performs logical mapping together with garbage collection GC during sequential write is written at a speed lower than the appropriate write speed Va at a first dip at the beginning of the first sequential write. This is because it takes time to search for or create free blocks for the garbage collection GC due to wide-area mapping characteristics of the logical mapping. In addition, a plurality of dips occur in the middle of performing the second sequential write due to the garbage collection operation. Accordingly, the end time of each of the first sequential write and the second sequential write is a second time Tb which is greater than the first time Ta of FIG. 15.

Referring to FIG. 17, it can be seen that the storage device which performs logical mapping together with wear leveling WL during sequential write repeatedly experiences a second dip during the first sequential write and is written at a speed lower than the appropriate write speed Va. This is because it takes time to do a search and newly update the mapping so as to averagely adjust the wear of a nonvolatile memory due to wide-area mapping characteristics of the logical mapping. Accordingly, a third time Tc which is the end time of the first sequential write is greater than a fourth time Td which is the end time of the second sequential write.

The storage device 10 of embodiments of the present disclosure performs physical mapping on a namespace that utilizes sequential write. This reduces the time for search and mapping update for the garbage collection GC and the wear leveling WL, thereby increasing the speed of the sequential write operation.

Figure 18:
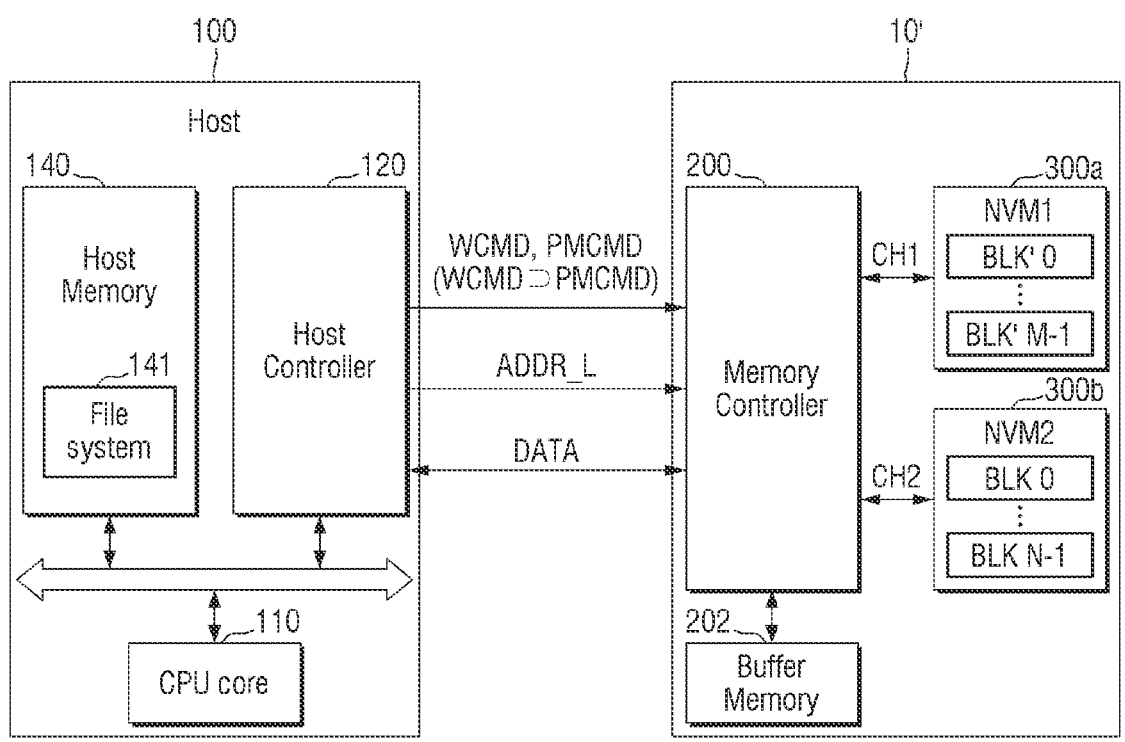
FIG. 18 is a block diagram of an electronic system including a storage device according to embodiments of the present disclosure.
Figure 19:
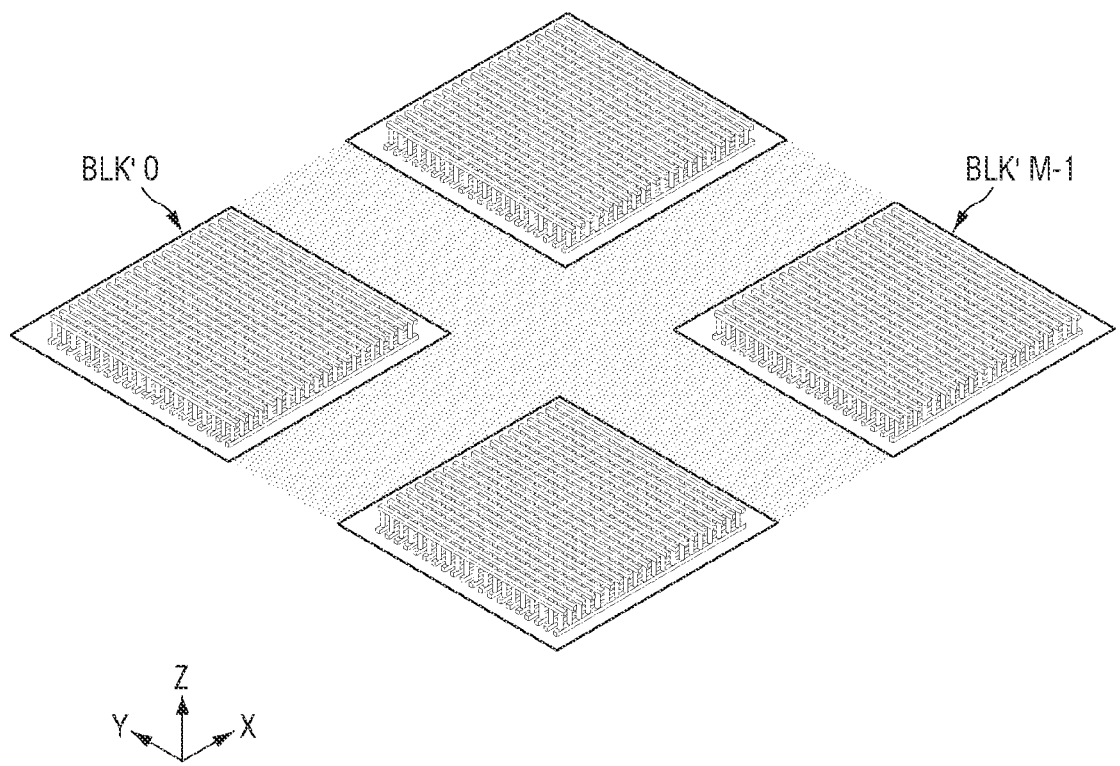
FIG. 19 schematically illustrates the inside of a nonvolatile memory according to embodiments of the present disclosure.
Figure 20:
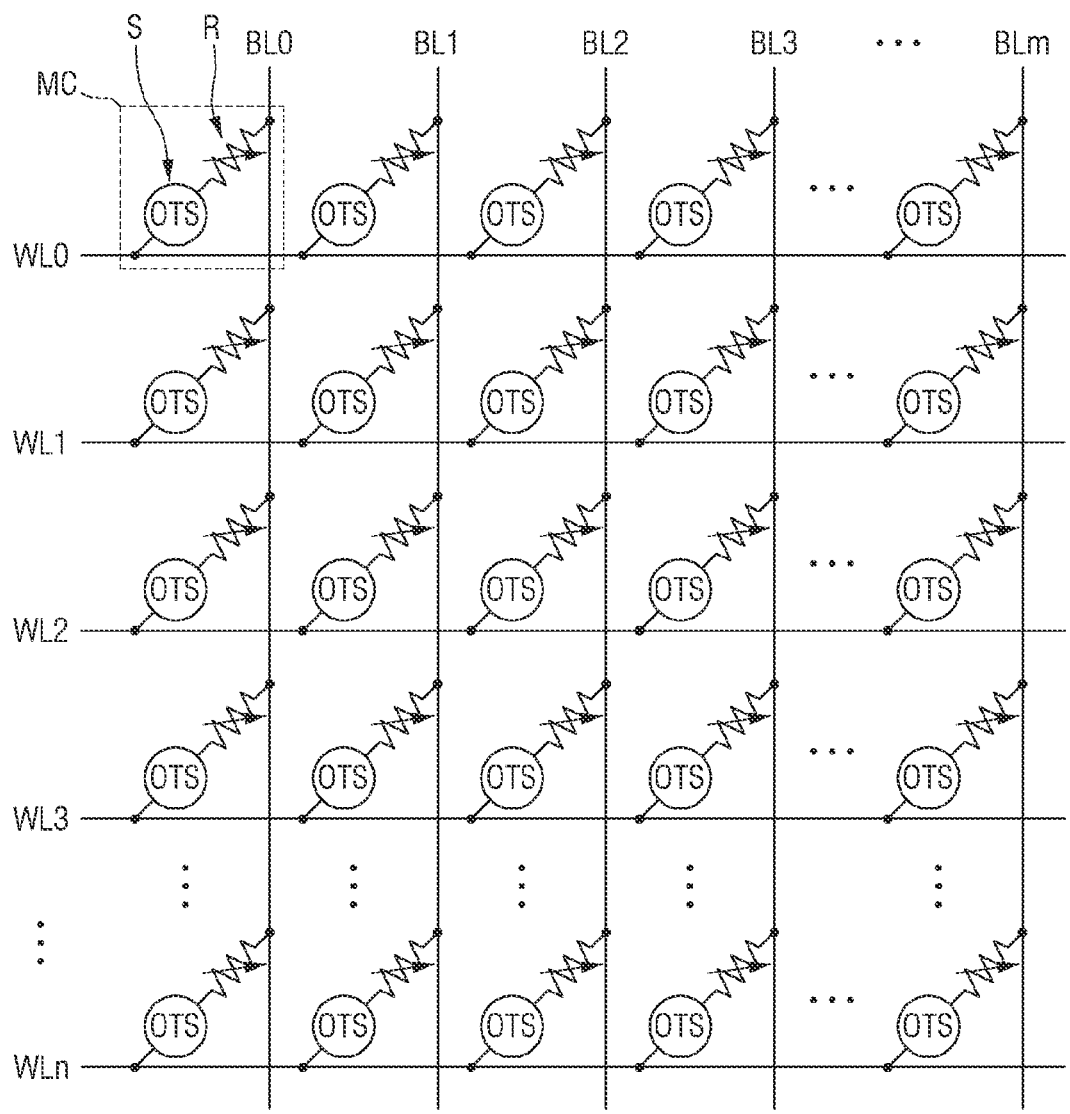
FIG. 20 is an exemplary circuit diagram of a part of a memory cell array according to embodiments of the present disclosure.

FIG. 18 is a block diagram of an electronic system 2 including a storage device 10' according to embodiments of the present disclosure. FIG. 19 schematically illustrates the inside of a nonvolatile memory according to embodiments of the present disclosure. FIG. 20 is an exemplary circuit diagram of a part of a memory cell array according to embodiments of the present disclosure.

The electronic system 2 according to embodiments of the present disclosure will now be described with reference to FIGS. 18 through 20. The following description will focus on differences from the electronic system 1 illustrated in FIG. 2, and for convenience of explanation, a further description of components and technical aspects previously described will be omitted.

Referring to FIGS. 18 through 20, the storage device 10' may include a first nonvolatile memory 300a and a second nonvolatile memory 300b. According to embodiments, the first nonvolatile memory 300a and the second nonvolatile memory 300b may be heterogeneous memories. For example, the first nonvolatile memory 300a may be a PRAM, and the second nonvolatile memory 300b may be a flash memory.

The operation of the first nonvolatile memory 300a may be controlled through a first channel CH1, and the operation of the second nonvolatile memory 300b may be controlled through a second channel CH2. A memory controller 200 may receive a write command WCMD and a logical address ADDR_L from a host device 100 and write data DATA to the first and second nonvolatile memories 300a and 300b.

Nonvolatile memory blocks in the first nonvolatile memory 300a may be physically mapped to the zero$^{th}$ and first memory blocks BLK 0 and BLK 1 of FIG. 11, and memory blocks in the second nonvolatile memory 300b may be logically mapped to the second through $(N-1)^{th}$ memory blocks BLK 2 through BLK N-1 of FIG. 11.

The structure of the second nonvolatile memory 300b of the storage device 10' may correspond to the structure of the nonvolatile memory 300 of FIG. 2.

Referring to FIGS. 19 and 20, the structure of the first nonvolatile memory 300a will be described. The first nonvolatile memory 300a may include zero$^{th}$ through $(M-1)^{th}$ nonvolatile memory blocks BLK' 0 through BLK' M-1. The zero$^{th}$ through $(M-1)^{th}$ nonvolatile memory blocks BLK' 0 through BLK' M-1 may be spaced apart from each other in a first direction X and/or a second direction Y. Each of the zero$^{th}$ through $(M-1)^{th}$ nonvolatile memory blocks BLK' 0 through BLK' M-1 includes a plurality of memory cells.

The structure of the zero$^{th}$ nonvolatile memory block BLK' 0 will be described by way of example. It is to be understood that the description of the zero$^{th}$ nonvolatile memory block BLK' 0 is also applicable the other nonvolatile memory blocks. The zero$^{th}$ nonvolatile memory block BLK' 0 may include, for example, PRAM cells.

The zero$^{th}$ nonvolatile memory block BLK' 0 may be a 2D memory. If the zero$^{th}$ nonvolatile memory block BLK' 0 includes multiple layers, it may be a 3D memory.

The zero$^{th}$ nonvolatile memory block BLK' 0 may include a plurality of word lines WL0 through WLn, a plurality of bit lines BL0 through BLm, and a plurality of memory cells MC. The number of word lines WL, the number of bit lines BL, and the number of memory cells MC may vary according to embodiments of the present disclosure. A set of memory cells simultaneously accessible by the same word line may be defined as a page.

In the zero$^{th}$ nonvolatile memory block BLK' 0 according to embodiments of the present disclosure, each of the memory cells MC may include a variable resistance element R and a select element S. Here, the variable resistance element R may be referred to as a variable resistor (or a variable resistance material), and the select element S may be referred to as a switching element.

In the zero$^{th}$ nonvolatile memory block BLK' 0 according to embodiments of the present disclosure, the select element S may be an ovonic threshold switch (OTS) selector including a compound such as, for example, GeSe, GeS, AsSe, AsTe, AsS SiTe, SiSe, SiS, GeAs, SiAs, SnSe, SnTe, GeAsTe, GeAsSe, AlAsTe, AlAsSe, SiAsSe, SiAsTe, GeSeTe, GeSeSb, GaAsSe, GaAsTe, InAsSe, InAsTe, SnAsSe, SnAsTe, GeSiAsTe, GeSiAsSe, GeSiSeTe, GeSeTeSb, GeSiSeSb, GeSiTeSb, GeSeTeBi, GeSiSeBi, GeSiTeBi, GeAsSeSb, GeAsTeSb, GeAsTeBi, GeAsSeBi, GeAsSeIn, GeAsSeGa, GeAsSeAl, GeAsSeTl, GeAsSeSn, GeAsSeZn, GeAsTeIn, GeAsTeGa, GeAsTeAl, GeAsTeT, GeAsTeSn, GeAsTeZn, GeSiAsSeTe, GeAsSeTeS, GeSiAsSeS, GeSiAsTeS, GeSiSeTeS, GeSiAsSeP, GeSiAsTeP, GeAsSeTeP, GeSiAsSeIn, GeSiAsSeGa, GeSiAsSeAl, GeSiAsSeTl, GeSiAsSeZn, GeSiAsSeSn, GeSiAsTeIn, GeSiAsTeGa, GeSiAsTeAl, GeSiAsTeTl, GeSiAsTeZn, GeSiAsTeSn, GeAsSeTeIn, GeAsSeTeGa, GeAsSeTeAl, GeAsSeTeTl, GeAsSeTeZn, GeAsSeTeSn, GeAsSeSIn, GeAsSeSGa, GeAsSeSAl, GeAsSeSTl, GeAsSeSZn, GeAsSeSSn, GeAsTeSIn, GeAsTeSGa, GeAsTeSAl, GeAsTeSTl, GeAsTeSZn, GeAsTeSSn, GeAsSeInGa, GeAsSeInAl, GeAsSeInTl, GeAsSeInZn, GeAsSeInSn, GeAsSeGaAl, GeAsSeGaTl, GeAsSeGaZn, GeAsSeGaSn, GeAsSeAlTl, GeAsSeAlZn, GeAsSEAlSn, GeAsSeTlZn, GeAsSeTlSn, GeAsSeZnSn, GeSiAsSeTeS, GeSiAsSeTeIn, GeSiAsSeTeGa, GeSiAsSeTeAl, GeSiAsSeTeTl, GeSiAsSeTeZn, GeSiAsSeTeSn, GeSiAsSeTeP, GeSiAsSeSIn, GeSiAsSeSGa, GeSiAsSeSAl, GeSiAsSeSTl, GeSiAsSeSZn, GeSiAsSeSSn, GeAsSeTeSIn, GeAsSeTeSGa, GeAsSeTeSAl, GeAsSeTeSTl, GeAsSeTeSZn, GeAsSeTeSSn, GeAsSeTePIn, GeAsSeTePGa, GeAsSeTePAl, GeAsSeTePTl, GeAsSeTePZn, GeAsSeTePSn, GeSiAsSeInGa, GeSiAsSeInAl, GeSiAsSeInTl, GeSiAsSeInZn, GeSiAsSeInSn, GeSiAsSeGaAl, GeSiAsSeGaTl, GeSiAsSeGaZn, GeSiAsSeGaSn, GeSiAsSeAlSn, GeAsSeTeInGa, GeAsSeTeInAl, GeAsSeTeInTl, GeAsSeTeInZn, GeAsSeTeInSn, GeAsSeTeGaAl, GeAsSeTeGaTl, GeAsSeTeGaZn, GeAsSeTeGaSn, GeAsSeTeAlSn, GeAsSeSInGa, GeAsSeSInAl, GeAsSeSInTl, GeAsSeSInZn, GeAsSeSInSn, GeAsSeSGaAl, GeAsSeSGaTl, GeAsSeSGaZn, GeAsSeSGaSn, or GeAsSeSAlSn.

For example, the variable resistance element R may be connected between one of the bit lines BL0 through BLm and the select element S, and the select element S may be connected between the variable resistance element R and one of the word lines WL0 through WLn.

However, embodiments of the present disclosure are not limited thereto, and the select element S may also be connected between one of the bit lines BL0 through BLm and the variable resistance element R, and the variable resistance element R may be connected between the select element S and one of the word lines WL0 through WLn, in some embodiments.

The select element S may be connected between any one of the word lines WL0 through WLn and the variable resistance element R and may control the supply of a current to the variable resistance element R according to a voltage applied to the connected word line and bit line.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

In an embodiment of the present disclosure, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array. In an embodiment of the present disclosure, the 3D memory array includes vertical NAND strings that are vertically oriented such that at least one memory cell is located over another memory cell. The at least one memory cell may include a charge trap layer. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

While the present disclosure has been particularly shown and described with reference to the embodiments thereof, it will be understood by those of ordinary skill in the art that various changes in form and detail may be made therein without departing from the spirit and scope of the present disclosure as defined by the following claims.

What is claimed is:

1. A multi-namespace storage device, comprising:
a nonvolatile memory which comprises a first memory block and a second memory block different from the first memory block; and
a memory controller which receives from a host a command for requesting creation of a first namespace comprising a first logical block number and a second namespace comprising a first logical page number not included in the first logical block number and receives a physical mapping command for instructing physical mapping of the first namespace,
wherein the memory controller performs a first mapping operation by mapping the first logical block number to the first memory block and performs a second mapping operation by mapping the first logical page number to a first memory page included in the second memory block in response to the physical mapping command,
wherein the first namespace comprises a second logical page number not included in the first logical block number, and the memory controller performs a third mapping operation by mapping the second logical page number to the first memory block, together with the first mapping operation.

2. The storage device of claim 1, wherein the first memory block corresponds exclusively to the first logical block number through the first mapping operation.

3. The storage device of claim 2, wherein the second mapping operation is not performed on the first memory block.

4. The storage device of claim 1, wherein the first logical block number comprises (1_0)-th through (1_N-1)-th logical block numbers, and the first memory block comprises (1_0)-th through (1_M-1)-th memory blocks, wherein N and M are natural numbers equal to 1 or more.

5. The storage device of claim 4, wherein the nonvolatile memory comprises m memory arrays, and M is an integer multiple of m.

6. The storage device of claim 1, wherein when the memory controller receives the physical mapping command, the first memory block is in an erased state.

7. The storage device of claim 1, wherein the first mapping operation comprises an erase operation performed on the first memory block.

8. The storage device of claim 1, wherein the memory controller receives a first write command for the first logical block number and a second write command for the first logical page number from the host, the first write command is accessed as a sequential write to the first memory block, and the second write command is accessed as a random write to the first memory page.

9. The storage device of claim 1, wherein the memory controller receives a command for requesting creation of a third namespace comprising a third logical page number, and the memory controller performs a fourth mapping operation by mapping the third logical page number to a second memory page included in the second memory block in response to the physical mapping command.

10. A multi-namespace electronic system, comprising:
a plurality of nonvolatile memories which comprise a first nonvolatile memory and a second nonvolatile memory;
a memory controller which controls the nonvolatile memories; and
a host which is connected to the memory controller and sends a command for requesting creation of a first namespace comprising a first logical block number and a second namespace comprising a first logical page number not included in the first logical block number,
wherein the host sends a physical mapping command for instructing physical mapping of the first namespace, and the memory controller performs a first mapping operation by mapping the first logical block number to a first memory block in the first nonvolatile memory and performs a second mapping operation by mapping the first logical page number to a first memory page included in the second nonvolatile memory in response to the physical mapping command,
wherein the first namespace comprises a second logical page number not included in the first logical block number, and the memory controller performs a third mapping operation by mapping the second logical page number to the first memory block, together with the first mapping operation.

11. The electronic system of claim 10, wherein the first nonvolatile memory is a phase-change random access memory (PRAM), and the second nonvolatile memory is a flash memory.

12. The electronic system of claim 10, wherein the first memory block corresponds exclusively to the first logical block number through the first mapping operation.

13. The electronic system of claim 10, wherein the memory controller receives a command for requesting creation of a third namespace comprising a third logical page number not included in the first logical block number, and the memory controller performs a fourth mapping operation by mapping the third logical page number to a second memory page included in the second nonvolatile memory in response to the physical mapping command.

14. The electronic system of claim 13, wherein the fourth mapping operation is performed after the second mapping operation and the second memory page and the first memory page are included in the same memory block of the second nonvolatile memory which is different from the first memory block.

15. A method of operating a multi-namespace storage device, the method comprising:
sending a command for requesting creation of a first namespace comprising a first logical block number and creation of a second namespace comprising a first logical page number not included in the first logical block number to a memory controller;
sending a first write command for the first logical block number to the memory controller together with a physical mapping command for instructing physical mapping of the first namespace;
storing first mapping information of the first logical block number to a first memory block corresponding to the first logical block number in a mapping table in response to the physical mapping command;
performing a first write operation on the first memory block in response to the physical mapping command;
sending a second write command for the first logical block number to the memory controller after sending the first write command;
performing a second write operation on the first memory block based on the second write command and the mapping table;
performing a first mapping operation by mapping the first logical block number to the first memory block in response to the physical mapping command;
performing a second mapping operation by mapping the first logical page number to a first memory page included in a second memory block different from the first memory block in response to the physical mapping command,
wherein the first namespace comprises a second logical page number not included in the first logical block number; and
performing a third mapping operation by mapping the second logical page number to the first memory block, together with the first mapping operation.

16. The method of claim 15, wherein the second write operation is performed while the first mapping information is maintained.

17. The method of claim 15, wherein the first write operation and the second write operation are accessed as sequential writes to the first memory block.

* * * * *